March 28, 1933. D. L. SUMMEY 1,903,147
POWER CONTROL APPARATUS
Original Filed March 12, 1926 13 Sheets-Sheet 2

March 28, 1933. D. L. SUMMEY 1,903,147
POWER CONTROL APPARATUS
Original Filed March 12, 1926 13 Sheets-Sheet 3

INVENTOR
David L. Summey
BY
Philipp Sawyer Rice Kennedy
HIS ATTORNEYS

March 28, 1933.　　　D. L. SUMMEY　　　1,903,147
POWER CONTROL APPARATUS
Original Filed March 12, 1926　　13 Sheets-Sheet 4

INVENTOR
David L. Summey
BY Philipp Sauger
   Ric Kennedy
HIS ATTORNEYS

March 28, 1933. D. L. SUMMEY 1,903,147
POWER CONTROL APPARATUS
Original Filed March 12, 1926 13 Sheets-Sheet 5

INVENTOR
David L. Summey
BY
HIS ATTORNEYS

Fig. 9.

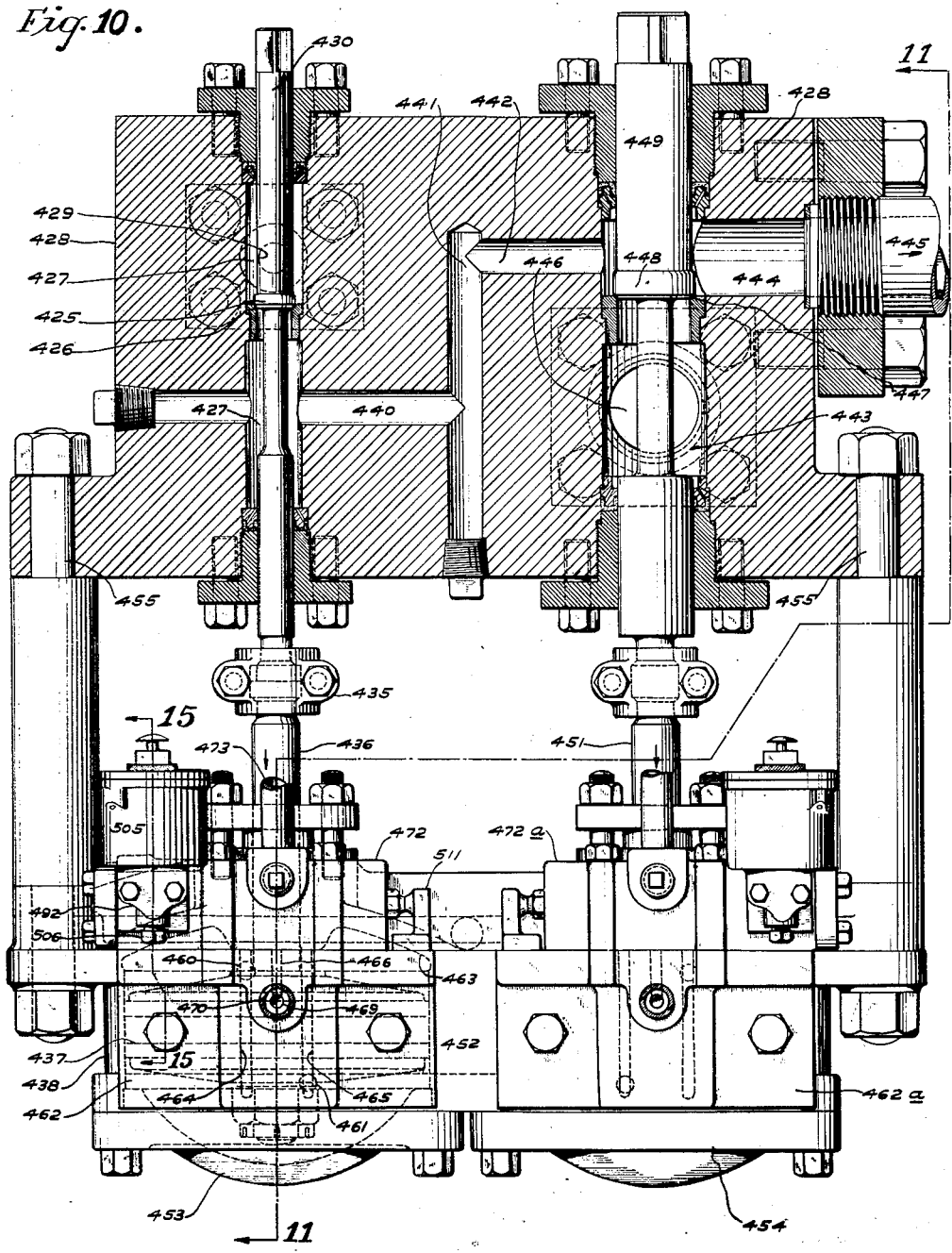

March 28, 1933.    D. L. SUMMEY    1,903,147
POWER CONTROL APPARATUS
Original Filed March 12, 1926    13 Sheets-Sheet 8
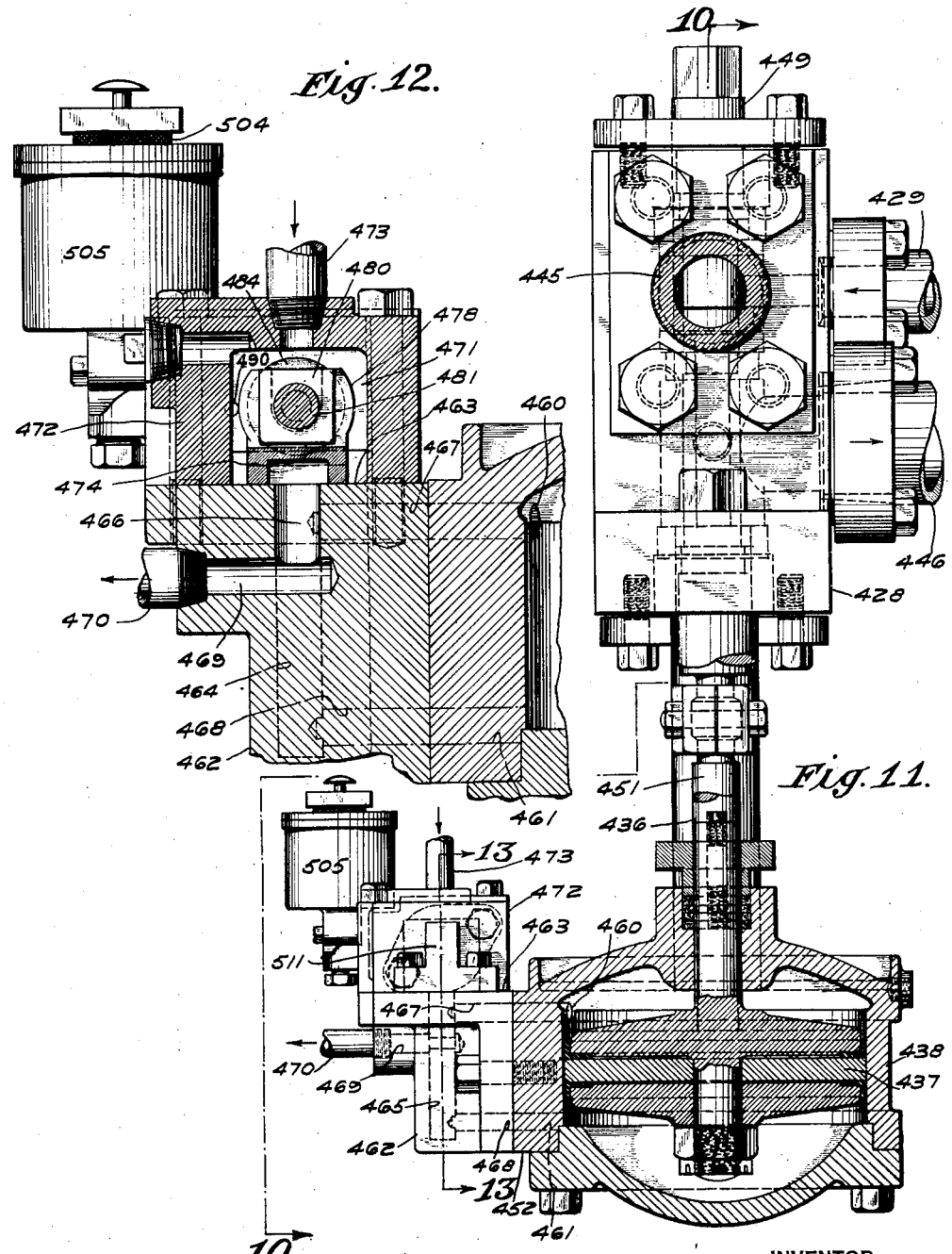
INVENTOR
David L. Summey
BY
Philip Sawyer Rice Kennedy
HIS ATTORNEYS March 28, 1933.   D. L. SUMMEY   1,903,147
POWER CONTROL APPARATUS
Original Filed March 12, 1926   13 Sheets-Sheet 9

INVENTOR
David L. Summey
BY
Philip Sawyer Rice & Kennedy
HIS ATTORNEYS

March 28, 1933.  D. L. SUMMEY  1,903,147
POWER CONTROL APPARATUS
Original Filed March 12, 1926   13 Sheets-Sheet 10

INVENTOR
David L. Summey
BY
HIS ATTORNEYS

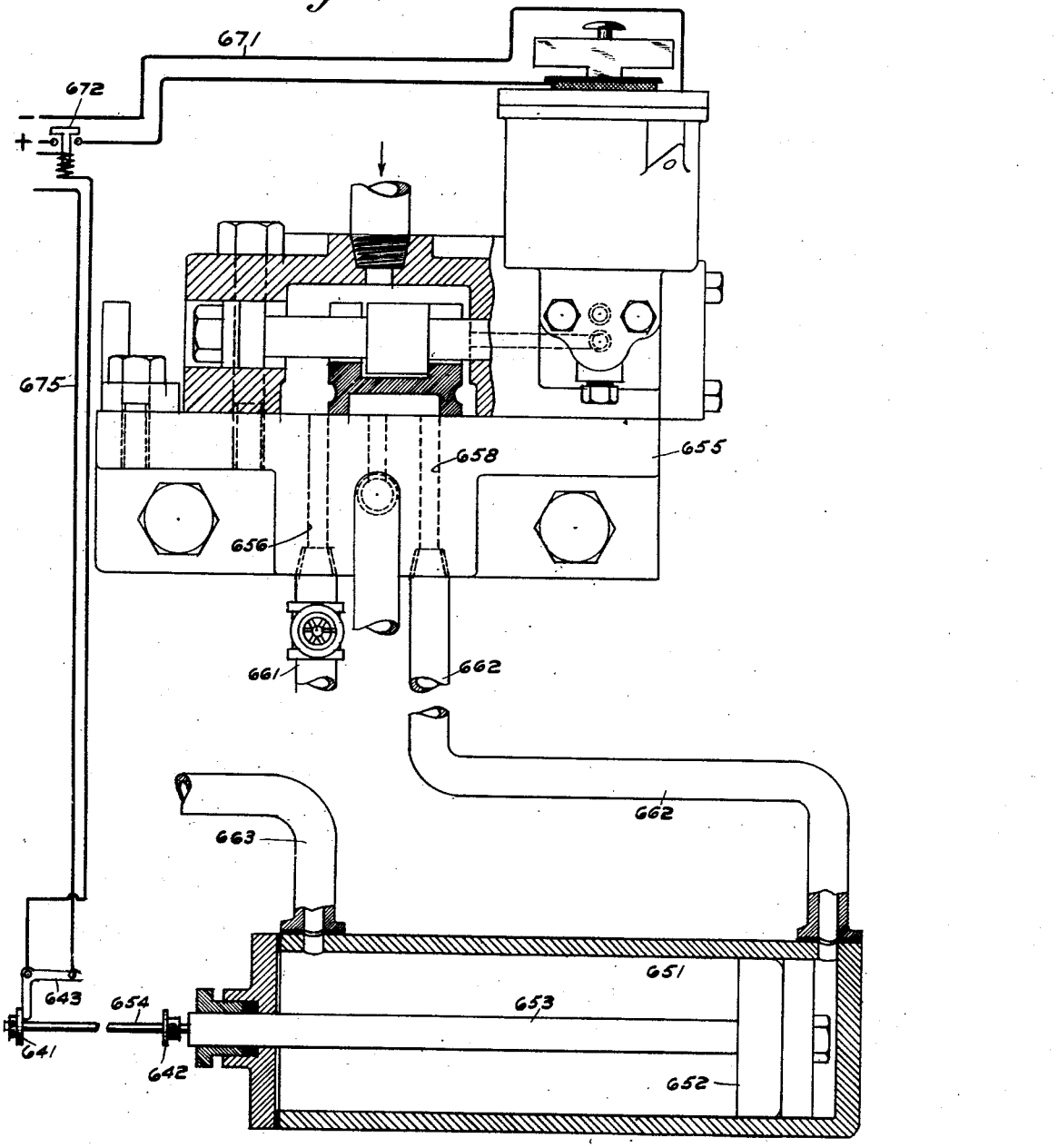

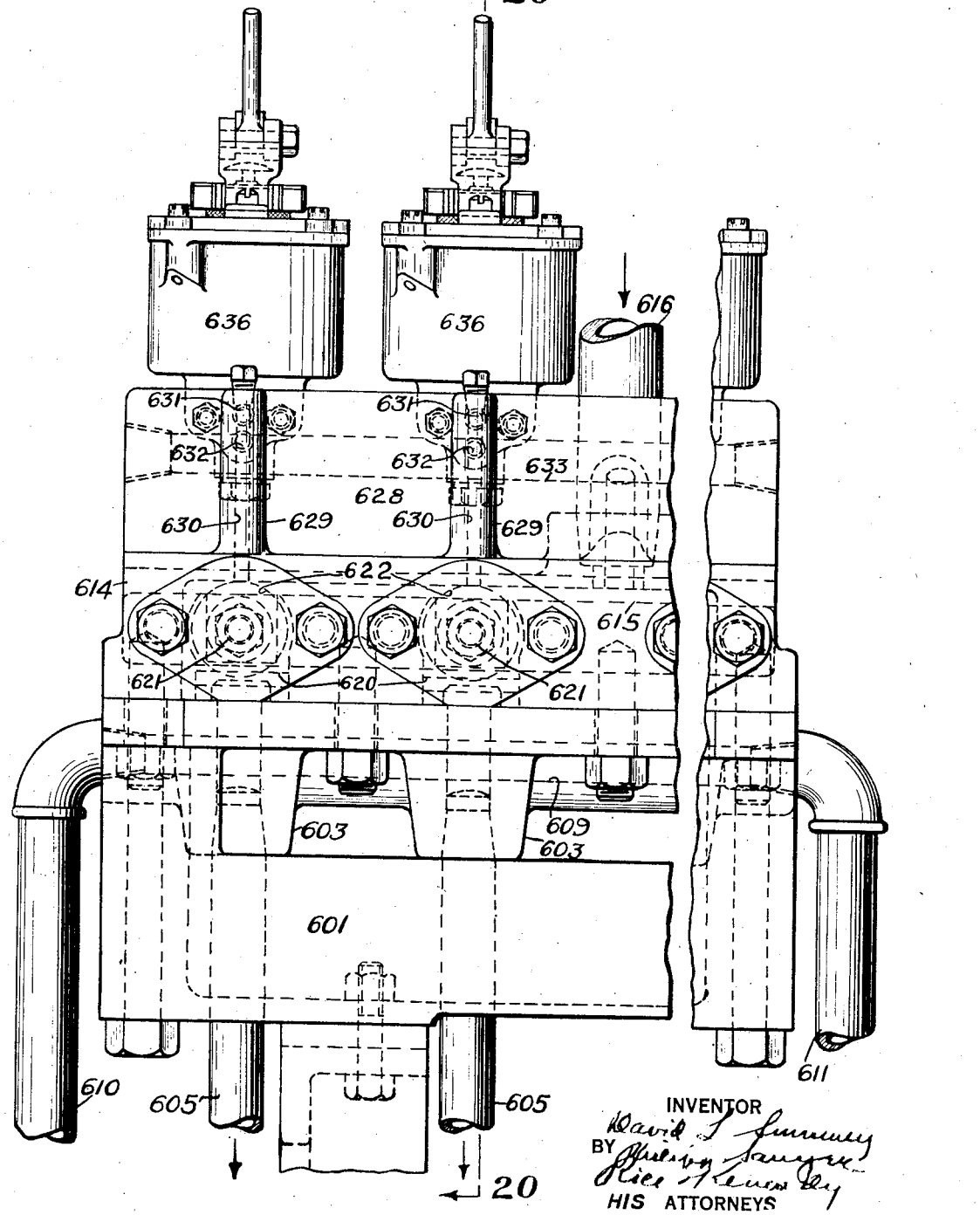

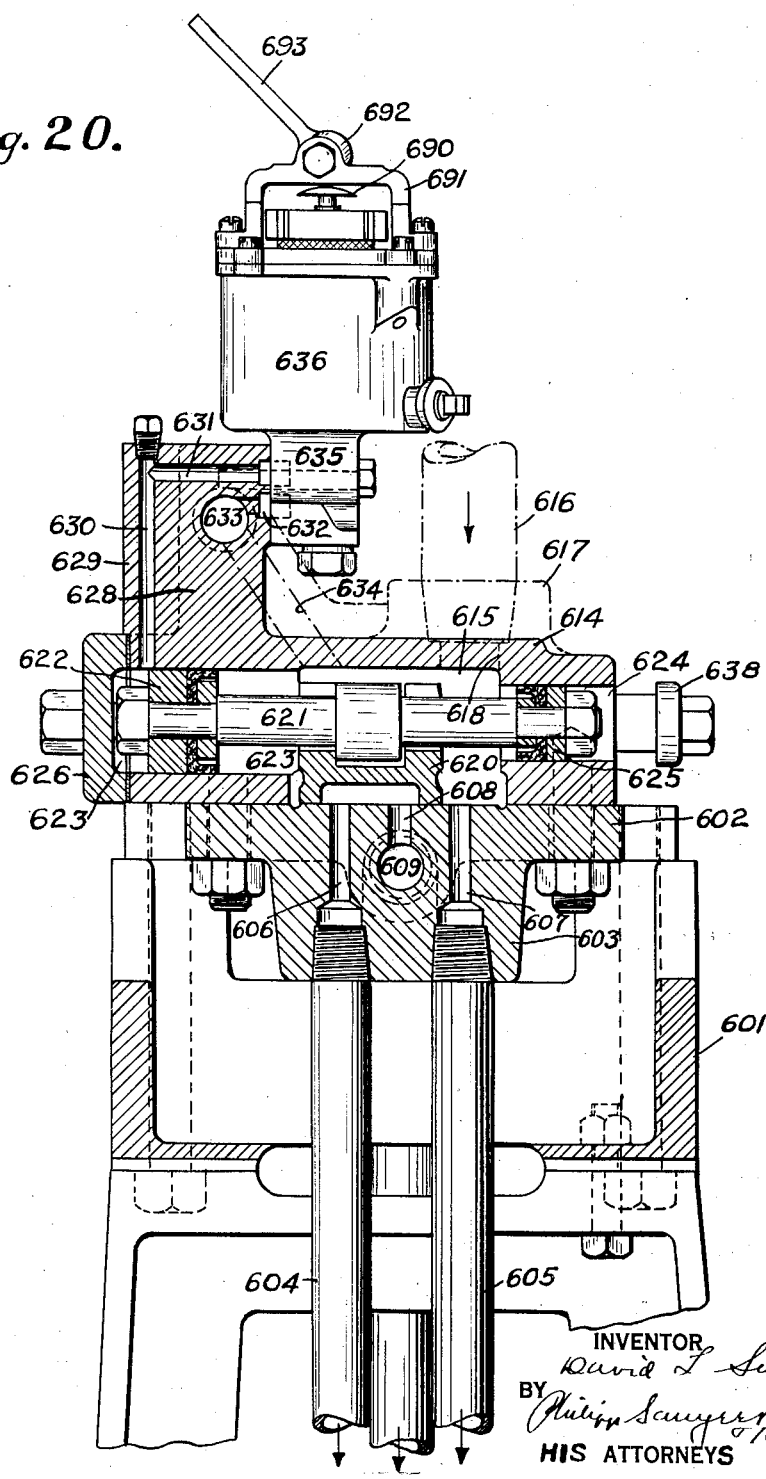

Patented Mar. 28, 1933

1,903,147

UNITED STATES PATENT OFFICE

DAVID L. SUMMEY, OF WATERBURY, CONNECTICUT; THE COLONIAL TRUST COMPANY AND RICHARD P. WEEKS SUMMEY EXECUTORS OF SAID DAVID L. SUMMEY, DECEASED

POWER CONTROL APPARATUS

Original application filed March 12, 1926, Serial No. 94,334. Divided and this application filed September 21, 1928. Serial No. 307,541.

This invention relates to power control apparatus.

This application is a division from an application filed March 12, 1926, Serial No. 94,334.

It is an object of the invention to provide apparatus in which a plurality of power elements are controlled so as to operate through a given cycle automatically, the operation of one element being dependent upon the operation of some other element or elements or some condition of the apparatus.

With this general object, and others not specifically referred to, in view, the invention consists in the features, combinations, details of construction and arrangements of parts which will first be described in connection with the accompanying drawings and then more particularly pointed out.

In the drawings,

Figure 5 is a detail view showing a portion of Fig. 3 in a different position of the parts;

Figure 6 is a vertical sectional view taken on the line 6—6 of Figs. 1 and 2;

Figure 7 is a detail view showing, in horizontal section, the parts in the position of Fig. 3;

Figure 9 is a wiring diagram;

Figure 10 is a sectional view, taken on the line 10—10 of Fig. 11, of a hydraulic valve unit;

Figure 11 is a sectional view, in end elevation, taken on the broken line 11—11 of Fig. 10;

Figure 12 is a sectional view, taken on the line 12—12 of Fig. 13;

Figure 17 is a diagrammatic view of a typical fluid pressure unit with a wiring diagram;

Figure 18 is a similar view of an air-operated power unit;

Figure 19 is a view in side elevation of a central control station; and

Figure 20 is a sectional view taken on the line 20—20 of Fig. 19.

Figure 1:
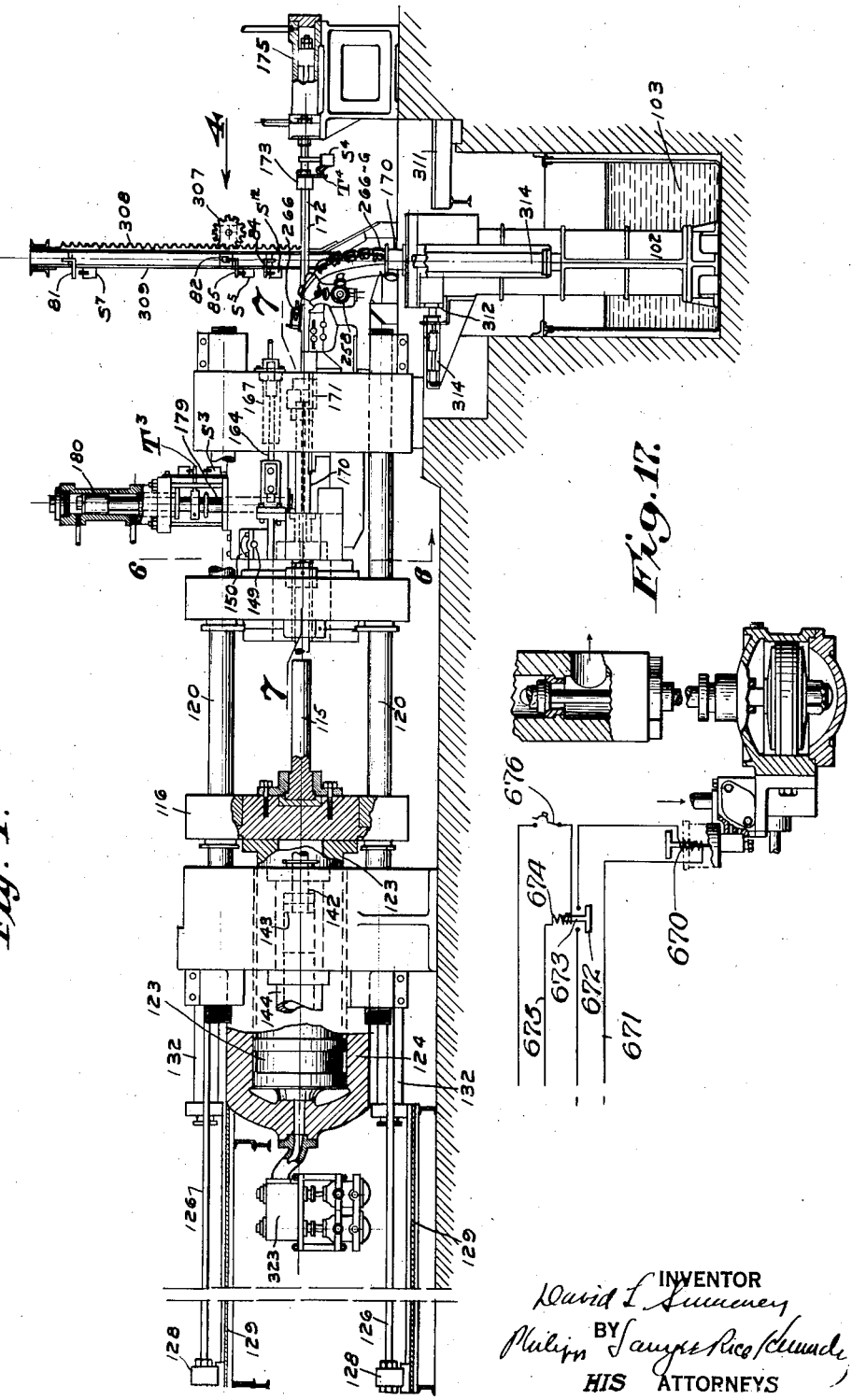
Figure 1 is a view, partly in side elevation and partly in vertical section, of a combined extrusion press and coiler constructed in exemplification of the invention.

Referring to the drawings, which illustrate the invention as applied to an extrusion press and coiler, a billet 125 is extruded by a ram 115 mounted on a crosshead 116 which slides on horizontal columns or tie rods 120. Crosshead 116 is moved to drive the ram forward by a hydraulic plunger 123 which is secured to part of the crosshead. This plunger operates in a large hydraulic cylinder 124 to which pressure water is admitted as later described. The plunger 123 is advanced to operate the ram by pressure in cylinder 124 and is withdrawn by means of two pairs of draft rods 126 located above and below the ram cylinder. Each pair of rods is connected with a crosshead 116, the other ends of each pair being secured to a yoke 128 sliding on a track 129 and secured to a piston 130. These pistons operate in relatively small pull-back cylinders 132 which are directly connected with the main water supply. Being under constant, i. e. continuous, pump pressure, their tendency is to move the crosshead backward but because of their relatively small size they are effective only when pressure is removed from the large cylinder 124.

The billet is held by a container 134 which, in the present embodiment, comprises two concentric cylindrical sleeves 135, 136, having a billet chamber 137. This container is mounted on a crosshead 138 which slides on the tie rods 120. Movement of the container crosshead 138 is effected by piston rods 142 to which the crosshead is connected and on which are pistons 143 operating in hydraulic cylinders 144. The crosshead 138 is moved in one direction, namely, toward the left as viewed in Fig. 8, by valve-controlled pressure fluid on pistons 143, as later described. The pistons are moved in the opposite direction by constant return pressure received from a direct connection with the main water supply. As this constant return pressure operates on a smaller piston area, it becomes effective only when the valve-controlled pressure is relieved.

In this connection, it is noted that "constant return pressure" refers to continuous, direct-connected main line pressure acting on smaller piston area and "variable pressure" refers to valve controlled main line pressure acting on greater piston area.

Movable across the axis of the container chamber and ram, in a suitable guide frame 147a, is a reciprocating slide 147. This slide is moved by a piston rod 149 to which it is secured and which has a piston operating in a hydraulic cylinder 150. This unit is operated in the same way as the container crosshead, namely, by variable pressure, controlled as later described, and constant return pressure. Slide 147 is to position a die and to position the billet for insertion. To render the billet chamber accessible for the insertion of the billet and for the removal of the stump, the slide is cut away at each end to form deep offsets 153, 154 (Fig. 6). These are so positioned that when the slide reaches either end of its stroke the end of the billet chamber is exposed. Adjacent offset 153 is a cradle 155 for a billet and leading away from offset 154 is a discharge runway 155a for the stump. The slide 147 takes an intermediate position to position a die in line with the axis of the container chamber. The die 156 here shown as an example has twin extruding bores, illustrated in Figs. 6 and 7, so that two rods are formed simultaneously from a single billet. Different dies may be substituted, having bores of different diameters, the die being hung on the carrier slide.

Backing for the extrusion force is provided by the die carrier. To this end, the central portion of the carrier is a thick heavy block 157. Set in the block behind the die is a cylinder 158 substantially larger in diameter than the die. This cylinder and the block have passages therethrough (Fig. 7) in line with the die bores for the passage of the extruded rods.

To control the several positions of the slide during the cycle of operations, automatic stops are provided. At the billet-carrying end of the slide is a stop 162 which makes contact with the slide guide frame 147a to stop the carrier in billet-inserting position. At the other end is a similar stop 163 which makes contact with the other side of the slide guide frame to stop the carrier at the other end of its stroke in a position for expulsion of the stump. This stop, however, is an emergency one as later described. For die centering position, a latch 164 is provided which enters a notch 165 formed in the slide. The latch is attached to the end of a piston rod 166 working in an air cylinder 167, the air supply of which is controlled as later described. The air pressure normally holds the latch advanced to a position to enter the notch. The latch is withdrawn by a coil spring 169 bearing against the face of the piston and effective upon release of the air pressure. One side of the notch is abrupt and the other side sloping so that after a billet has been placed on the cradle the carrier slide moves to billet-inserting position regardless of the latch which merely rides up the slope. But when the carrier slide moves back for die-centering the latch slips into a notch and by its contact with the abrupt face stops the slide in extruding position.

To insert a billet into the container after the slide has positioned the billet, there is provided a billet pusher. As here shown as an example, this billet pusher is in the form of a tube 170. This tube has a second function, that of serving as a conduit for the extruding rods, as later described. Tube 170 is mounted in a head 171 connected by draft rods 172 with a crosshead 173. The latter is mounted on the end of a piston rod 174 having a piston working in a hydraulic cylinder 175 that receives variable pressure as later described and is under constant return pressure.

To sever the extruded stock from the stump, a cutter is provided in the form of drop-bar shears. As shown, a cutting plate 178 is mounted on a vertically disposed piston rod 179 having its piston operating in a hydraulic power cylinder 180. This cylinder receives variable water pressure through a valve unit to be described and is under constant return pressure. When variable pressure is admitted, the cutter is forced downward to cut the stock. When this variable pressure is relieved the constant return pressure becomes effective and withdraws the cutter. The cutter is so located that it operates in close proximity to the back of the die-carrier so that, after cutting, there is left only a short stump representing extruded metal in the die-carrier.

The cycle of operation of the parts so far described starts with the billet pusher back, the ram back, the cutter back, the container near the slide and the slide in the position of Fig. 6. A billet is placed on the cradle and the slide moved over until stopped by stop 162 with the billet in line with the container. The billet pusher is then advanced to push the billet into the container. The pusher is withdrawn and the slide moved across the container mouth until its notch is engaged by latch 164. This positions the die in line with the ram (Fig. 6). The container is then moved up until its mouth takes over the die (Fig. 7) and the billet pusher is moved up to abut the slide and function as a conduit for the emerging rods. The main ram is now advanced against the billet and the metal is extruded through the die bores into the form of rods, the disposition of the extruded stock being later described. When all but a short dead end is extruded the ram is stopped and withdrawn and the pusher is withdrawn. The cutter is operated and the container is moved back to withdraw the stump. Continued back movement of the container brings the stump against the end of the withdrawn ram for expulsion.

In case a stump or billet becomes frozen in the container, latch 164 is released and the slide moved over to the extreme left (Fig. 6) until stopped by stop 163, to expose the container chamber. The ram is then advanced against the stump or billet and the latter is ejected by the full force of the ram unit. If this emergency operation takes place the resulting slide position may be considered billet-receiving position as it is merely an overthrow beyond normal initial position.

Disregarding the control, so much of the apparatus as has been described is substantially like that of applicant's Patent No. 1,317,238, issued September 30, 1919, except that the billet pusher is different in construction, though performing the same pushing operation, and the die has twin bores.

There is provided means for coiling the extruded rods. As here shown as an example, beyond the press is a pit 101 containing two cylindrical coiling tanks 102, the lower ends of which seat in a water tank 103 and have perforated bottoms to let in water. In each coiling tank is a stationary hollow central post 104 (Fig. 4) having a conical top 105 and a bottom open to the water. Between the wall of each tank and its central post is a normally stationary platform 106 for receiving the coils. Mounted above the mouth of each tank and centrally thereof is a whipping block 107 rotating on a vertical axis and having an oblique bore 108. The upper mouth of the bore is coaxial with the block and is in line with the vertical path of the rod stock as it comes from the feeding rolls, later referred to. The block 107 is rotated, as later described, at substantially the normal speed of emergence of the rod and the rod, passing through the oblique bore, is whipped into loops (Fig. 4), which fall down about the conical post and are laid in a stationary coil on the platform. The tank walls and coiling posts form an annular receiving channel and the whipping block coils the rod in this channel in much the same way as a rope is coiled down by hand. The size of the loops, except as limited by the diameter of the tank, depends upon the speed of emergence of the rod and the speed of rotation of the whipping block.

Figure 3:
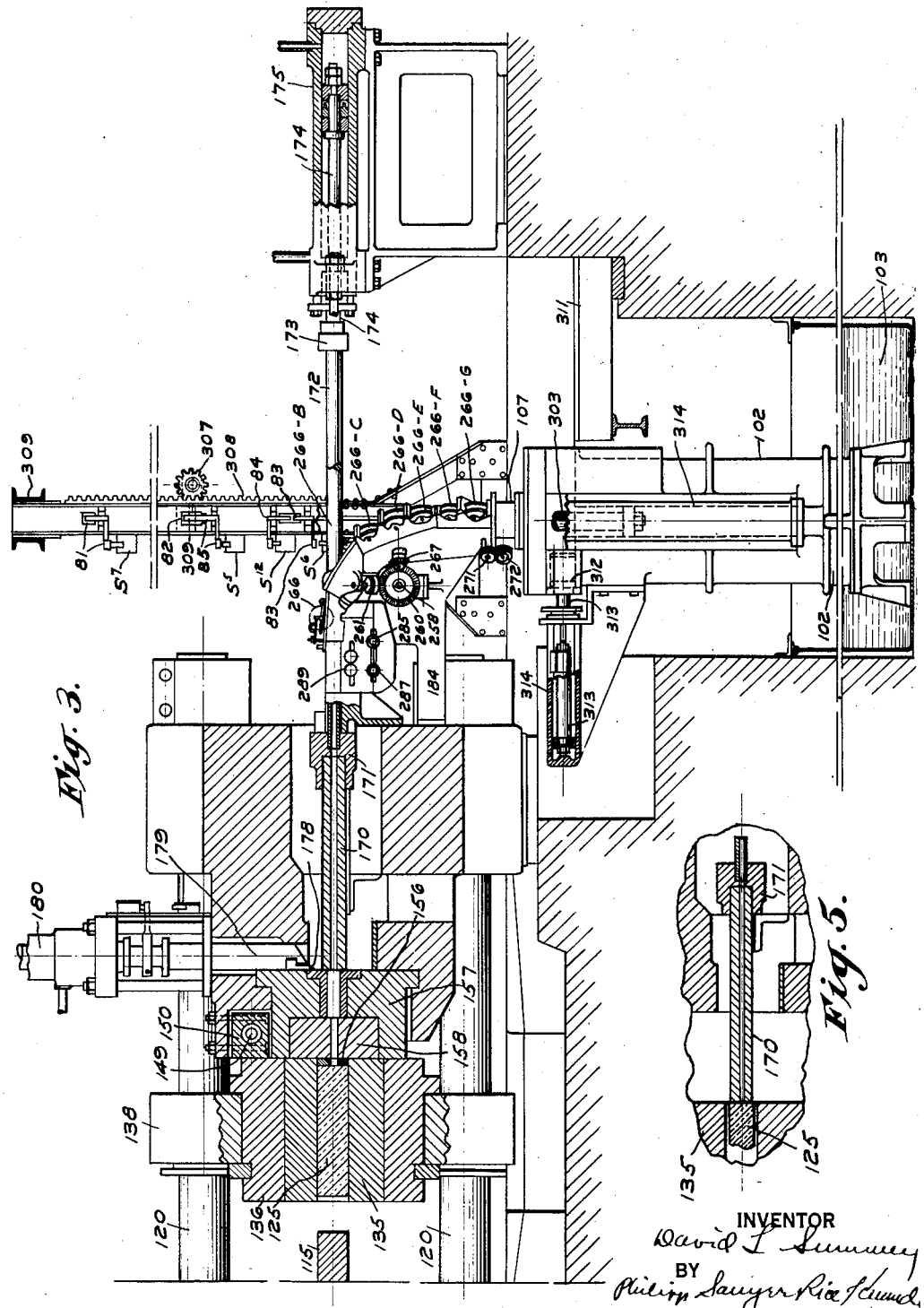
Figure 3 is an enlarged view of the coiler end of the apparatus, partly in side elevation and partly in section, showing the parts just prior to the extrusion of a billet.

There is provided means for guiding and feeding the extruded stock to the whipping block. Such means may conveniently include feeding rolls such as are more fully described in the parent application above mentioned. As here illustrated, at the start of extrusion the billet pusher 170 is advanced to abut the carrier slide (Figs. 3 and 7), its twin passages 183 registering with the passages through the slide to serve as conduits for the rods. These passages 183 are continued through crosshead 171 as will be apparent from Fig. 7. Beyond the crosshead 171 is a frame 184 for the feeding mechanism. This frame is formed with two parallel grooves 201, separated by a Y-shaped tongue or partition 202, in line with the passages 183. When the billet pusher is in withdrawn position (Fig. 6) crosshead 171 abuts frame 184. But when the pusher is advanced, as above referred to, there is a gap between the crosshead and grooves 201. This gap is bridged, as here shown, by twin tubes 185 secured in the crosshead 171 to form continuations of passages 183 and telescoping into grooves 201. The emerging rods advance, under the force of extrusion, through the passages 183 and tubes 185 into grooves 201, where they are guided by tongue 202 into the bite of the first pair of rolls. From there on they are taken by the succeeding rolls and fed forward under tension to the whipping blocks. The whipping blocks may be rotated by a connection with the feeding rolls, the rolls being driven in any suitable manner, for example, as described in the parent application referred to.

Means is provided for discharging the coiled rods from the coiling pits and as here shown as an example, the platforms 106 have a sliding bearing in the coiling tanks and are connected by three draft rods 301 with a crosshead 302. The draft rods slide in grooves in the tank walls, the central rod being common to both units, so as to present a flush surface to the whipping loops of the coiling stock. Bolted to the crosshead 302 are two piston rods 303 the pistons of which work in air cylinders 304 that are long enough to permit the necessary range of movement of the elevator unit above and below initial position. At the upper ends of the two cylinders 304 are two relatively short auxiliary cylinders 305 in which work auxiliary pistons 306 having piston rods 306ᵃ, the outer ends of which can abut the bottom of crosshead 302 but which are not connected thereto. The auxiliary power units are so positioned and have such stroke that when their pistons are fully advanced the piston rod ends abut the crosshead 302 when the latter is in initial position, and when withdrawn they permit descent of the elevator to cooling position. To steady the movement of the elevator unit the crosshead 302 has a bolster 300 which carries pinions 307 running on racks 308 located on the outer face of a frame element 309 formed by channel irons. In the embodiment shown, the two sets of power units are air operated. Admission of variable air pressure to the lower ends of the cylinders, to advance or raise the pistons, is valve controlled as later described, and the other ends are under constant return pressure for downward or withdrawing movement. In initial or coil-receiving position of the elevator unit, the crosshead is held up by the auxiliary power units, the main pistons being under return pressure which is ineffective against the variable pressure on the auxiliary pistons.

There is provided means for discharging the coils from the coiling platforms. This may be accomplished, in connection with the elevator above described, by transverse pushers. Although capable of various constructions, in that here shown as an example, substantially level with the tops of the coiling tanks (Fig. 3) is a discharge platform 311. Opposite this platform are twin discharge pushers, one for each coil. Each pusher comprises an arcuate coil-engaging element 312 mounted on a piston 313 working in a power cylinder 314. One end receives variable air pressure, as later described, and the other end is under constant return pressure. When the coiling platforms are elevated to discharge position, they are substantially flush with the platform 311. Pistons 313 are advanced by variable pressure and pushers 312 move the two coils onto the discharge platform. From here the coils may be removed in any suitable manner. Following discharge the pushers are withdrawn by return pressure.

The construction described is capable of at least two different cycles. In one type of elevator cycle, the elevator is moved from initial position downward to cool the extruded stock by quenching it in the water bath, then clear up to discharge position and finally part way down to initial position. In any other cycle, the extruded stock is not water cooled. Consequently, following coiling, the elevator is moved up to discharge position, then clear down to cool the platforms, and finally part way up to initial position.

Referring to the first type of cycle, to lower the elevator from initial position, the auxiliary pistons are withdrawn. As the main pistons are already under return pressure, for which gravity might be substituted, the elevator moves down to immerse the platforms and coils into the water bath. To raise the elevator, the main pistons are advanced the full length of their stroke and this moves the elevator up past initial position to discharge position. In such movement, of course, crosshead 302 simply draws away from the unconnected auxiliary pistons. After the coils are discharged, as above described, the elevator is returned to initial position by allowing the main pistons to descend under return pressure and using the auxiliary piston rods as positioning stops. To this end, the auxiliary pistons are returned to and held in initial position by variable pressure. When the descending crosshead strikes the ends of the auxiliary piston rods it is stopped in its down movement because the return pressure on the main pistons is ineffective against the auxiliary pistons. The parts are now ready for the next extrusion.

In the second type of cycle, the elevator, after completion of the coiling operation, is raised to discharge position by putting variable pressure on the main pistons, the crosshead drawing away from the auxiliary pistons. After discharge of the coils, the elevator is moved to cooling position, for platform cooling, by placing the auxiliary pistons under return pressure to get them out of the way, and putting the main pistons under return pressure to carry the elevator from extreme up position to extreme down position. To return the elevator to initial position, the main pistons are left under return pressure and the elevator is raised by putting the auxiliary pistons under variable pressure. The return pressure is ineffective against the variable pressure and the auxiliary piston rods, abutting the crosshead, raise the elevator to initial position. This position is, of course, automatically attained because it is governed by the stroke of the auxiliary pistons. This again places the parts for the next extrusion.

With the construction described the elevator may be stopped in a position intermediate its extreme range without the necessity of stopping the long power unit in the middle of a power stroke.

The invention in its entirety includes means whereby the operation of a plurality of power units is so controlled that the power units automatically operate through a given cycle, the operation of one unit being dependent on the operation of some other unit or some condition of the apparatus.

Figure 8:
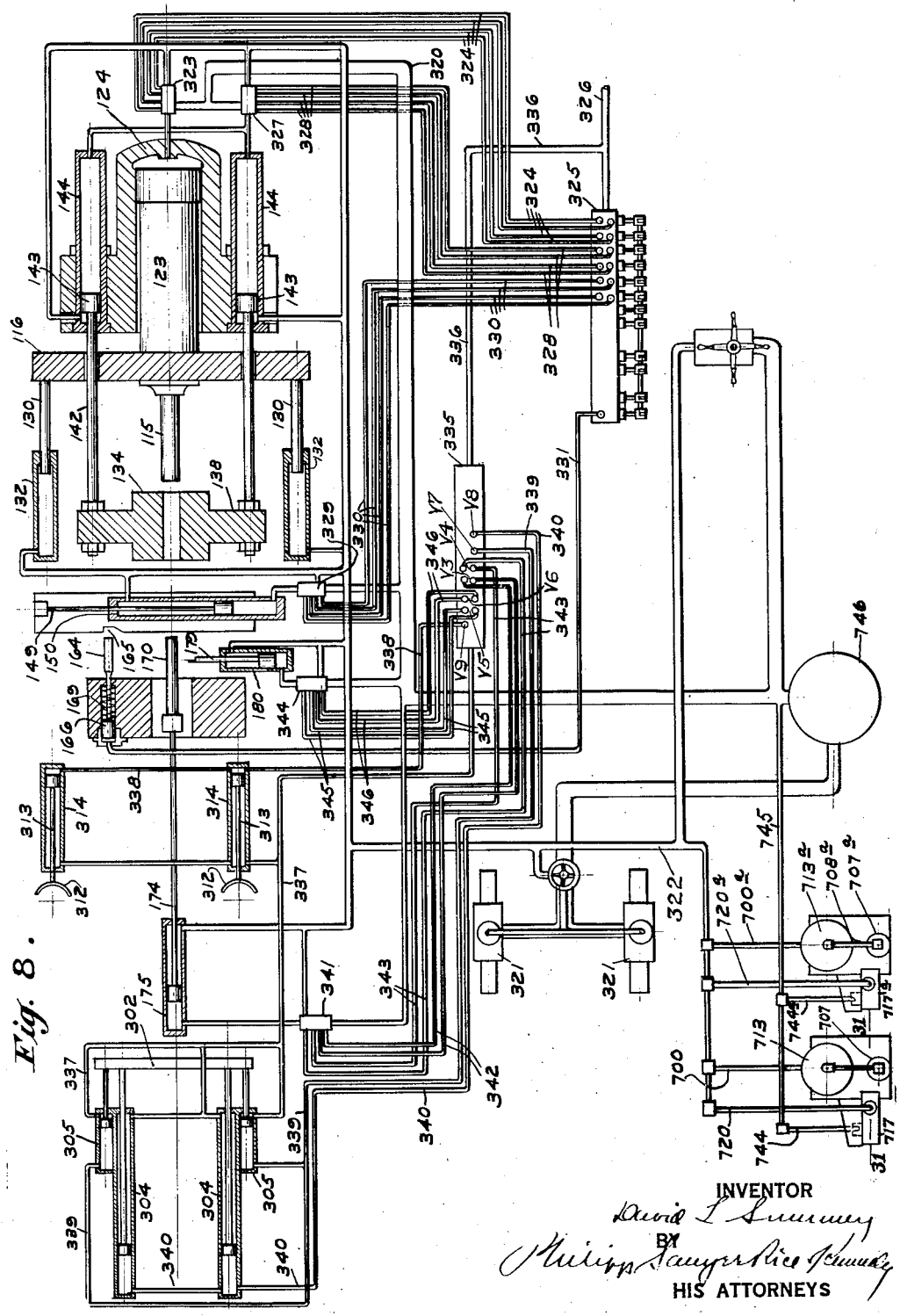
Figure 8 is a piping diagram.

In the embodiment here illustrated, the cycle is manually controlled up to the completion of the extruded rod and is thereafter automatically controlled. From suitable high pressure pumps 321 (Fig. 8) a main water line 322 leads to a hydraulic valve unit indicated by 323 and having connection with an exhaust water line 320 leading back to the pumps. This hydraulic valve unit is later referred to. Briefly, it comprises water inlet and exhaust valves each operated by a piston working in an air cylinder. Each piston is operated by air pressure delivered to one end or the other of the corresponding cylinder. Fig. 8 shows a group of air pipes 324, one pair for each cylinder, leading to suitable pilot valves at a manual control station 325 connected by a pipe 326 with a source of compressed air. By manual operation of these pilot valves the movement of the pistons referred to is controlled to open or close the hydraulic valves. The container unit is operated in the same way, that is, it has a valve unit 327, like unit 323, connected by a group of pipes 328 with pilot valves at the manual control station. Similarly the slide unit has a valve unit 329 with air pipes 330 leading to the manual control station. The manual control station also has a pilot valve controlling the air, through a pipe 331, to the latch unit. Normally the latch cylinder is under air pressure but the air may be cut off to withdraw the latch for the emergency expelling step above described.

While the automatic control may vary, in structures embodying the invention to the best advantage, it will include electrically operated elements for controlling the actuating air for the various power units, whether the air acts as a motive force directly or to actuate a hydraulic valve that controls water pressure. This may be accomplished by selective valves for controlling air flow, the valve actuation being controlled by a solenoid. In the case of hydraulic power units, e. g. the cutter unit, the selective valve may control the air that operates the hydraulic valves. In the case of air power units, e. g. elevator units, the selective valve may control the variable pressure air that actuates the units. Examples of such electrically controlled, selective valves are hereinafter described in detail. For the present, they are referred to as magnetic valves, it being assumed that such magnetic valves include a solenoid element. It is assumed further, for the present, that, in the case of magnetic valves controlling hydraulic units, the hydraulic valve, be it inlet or exhaust, is open when the magnetic valve is "on" i. e. when its solenoid is energized, and closed when the magnetic valve is "off", i. e. when its solenoid is in an open circuit. Also, it is assumed that, in the case of air pressure power units, the piston is under variable pressure when the magnetic valve is "on" and under constant return pressure when the magnetic valve is "off".

While the magnetic valves and their connections may be arranged in various ways, in the present embodiment they are collected at an automatic control station later referred to in more detail. Such a station is indicated by 335 in Figs. 8, 9. This station is connected with the air supply pipe by a branch pipe 336 and from the station a pipe 337 serves to supply constant return pressure to the coil discharge and elevator cylinders, as will be apparent from Fig. 8. At the central control station is a magnetic valve $V^9$ which controls variable pressure through pipe 338 leading to the coil ejector cylinders 314. Similar magnetic valves $V^7$, $V^8$, control variable pressure through pipes 339, 340, with the auxiliary elevator cylinders 305 and main elevator cylinders 304 respectively. In the case of the shears and billet pusher, which are operated by hydraulic power units, the magnetic valves control the air pressure for operating the hydraulic valves. The billet pusher has a hydraulic valve unit indicated in Fig. 8 by 341. This is like unit 323. But the two air pipes 342 for its exhaust valve lead to a magnetic valve $V^3$ and the two pipes 343 for the inlet valve lead to a magnetic valve $V^4$.

A similar arrangement is provided for the cutter. To this end, water to the cutter cylinder is controlled by a hydraulic valve unit 344 like unit 341. The two air pipes 345 for the inlet valve lead to a magnetic valve $V^5$ and the two pipes 346 for the exhaust valve lead to a magnetic valve $V^6$.

There is provided electrical means for controlling the status of the various magnetic valves and in structures embodying the invention to the best advantage, the solenoids of the magnetic valves will be included in circuits of a D. C. system and these circuits will be controlled by suitable make-and-break devices. In the embodiment here illustrated, the circuits for magnetic valves $V^3$, $V^4$ of the billet pusher are controlled by hand switches and the circuits for the remaining magnetic valves are controlled by relays or contactors, the solenoid coils of which are included in the wiring of an A. C. system. As here shown as an example, and referring to Fig. 9 particularly, the D. C. system (shown in full lines) comprises main line wires 353 connected with bus bars 356, 357, carried by a panel 354, and a supplemental bus 350. Magnetic valve $V^3$ for the exhaust valve of the billet pusher power unit is in a circuit controlled by a hand switch 113 on a panel 352 and magnetic valve $V^4$ for the inlet valve of the billet pusher unit is in a circuit controlled by a hand switch 114 on panel 352. Magnetic valves $V^5$, $V^6$ for the inlet and exhaust valves of the cutter unit are in circuits controlled by a contactor B on panel 354. This contactor, as well as the others later referred to, comprises a contact bar, a core and a coil and may be of any suitable description to include the various contact terminals hereinafter mentioned. Magnetic valve $V^7$ for the auxiliary elevator cylinders is in a circuit controlled by a contactor D and magnetic valve $V^8$ for the main elevator cylinders is in a circuit controlled by a contactor E. Magnetic valve $V^9$ is in a circuit controlled by a contactor G. The panel carries further contactors A, F and H later referred to.

The coils of the several contactors are included in circuits in an A. C. system (represented in the wiring diagram by broken lines) and including main line wires 355, bus bars 358, 359 and supplemental bus 351. As later described in detail, the circuits of the contact coils are controlled by switches automatically actuated by moving mechanical elements.

The following table shows the status of the several magnetic valves and the resulting starting position of the controlled parts—

V9—off—Discharge pushers withdrawn under return pressure.

V3—on—Exhaust valve of billet pusher open  
V4—off—Inlet valve of billet pusher closed  
} Billet pusher withdrawn under return pressure V5—off—Inlet valve of cutter closed  
V6—on—Exhaust valve of cutter open  
} Cutter withdrawn under return pressure V7—on—Auxiliary elevator units under v. p.  
V8—off—Main elevator units under c. p.  
} Elevators held in intermediate position by auxiliary units against return pressure on main units This is accomplished by so arranging the circuits and contactors or other switches that the magnetic valves have the status stated.

The following table shows the initial circuit arrangements, all the contactors, as later referred to, being down, i. e. open—

V3—on—Bus 357, hand switch 113 closed, wires 12, 11, bus 356.

V4—off—Bus 356, wires 11, 13, open switch 114.

V5—off—Bus 356, supplemental bus 350, wires 14a, 16, open break at contactor B.

V6—on—Bus 356, supplemental bus 350, wires 14, 15, bar of contactor B, wire 17, bus 357.

V7—on—Bus 356, supplemental bus 350, wires 7, 8, bar of contactor D, wire 9, bar of contactor H, wire 10, bus 357.

V8—off—Bus 356, supplemental bus 350, wires 4, 5, open break at contactor E.

V9—off—Bus 356, supplemental bus 350, wires 1, 2, open break at contactor G.

In the above table it was assumed that the contactors were all down. The following table gives the initial circuit arrangements resulting in this condition—

Contactor A. Coil in circuit containing hand switch 112 later referred to and now assumed to be open.

Contactor B. Coil in a circuit at contactor A which must be up before B can lift.

Contactor D. Coil in a circuit including open switch S3.

Contactor E. Coil in circuit broken at contactor D which must be up before E can lift.

Contactor F. Coil in circuit broken at contactor G which must be up before F can lift.

Contactor G. Coil in a circuit including open switch S7.

Contactor H. Coil in a circuit including open switches S8, S9.

At the start of an extruding operation, the magnetic valves and associated parts having the initial status and position described, it is assumed that the manual pilot valves have been operated so that the ram is back, the container nearly at the end of its forward stroke, i. e. toward the carrier slide, and the slide in billet-feeding position. A billet being in place on the cradle, the operator opens switch 113 and closes switch 114. This reverses solenoids V3, V4, from initial position and so opens the inlet hydraulic valve and closes the exhaust valve of unit 341 whereby the pusher is advanced to push the billet into the container. To withdraw the pusher again, the operator opens switch 114 and closes switch 113, which replaces the parts into initial position. By the manual pilot-valve control the slide is moved over and is stopped by latch 164 entering notch 165, which positions the slide with its die in line with the container chamber. The container is similarly caused to move forward until its mouth embraces the die (Fig. 7). The billet pusher is now advanced to abut the slide (Fig. 7) to function as a conduit for the extruded rods. This is accomplished by a repetition of its former advance movement, namely, by opening switch 113 and closing switch 114. The parts are now ready for the advance of the main ram for extrusion.

As later described, the withdrawing movement of the billet pusher actuates a switch S4 that controls the cutter movement. But since the pusher makes a withdrawing movement following billet insertion, provision is made whereby the mechanical operation of such switch is normally without effect but may be made effective at the option of the operator. In the present embodiment this is accomplished by making the electric control system effective only to maintain the parts in initial position until a preparatory circuit rearrangement is made by the operator. The switch S4 is in a circuit that controls the coil of contactor B. As shown, contactor B is rendered ineffective, even when switch S4 is closed by including in its circuit contactor A. The preparatory step, therefore, consists in causing contactor A to lift so that contactor B ment is made by the operator. The switch S4 is in a circuit that controls the coil of contactor B. As shown, contactor B is rendered ineffective, even when switch S4 is closed by including in its circuit contactor A. The preparatory step, therefore, consists in causing contactor A to lift so that contactor B may function at the proper time. As shown, this is accomplished by a hand switch 112, which is a momentary contact switch of any suitable description and which is in the circuit controlling the coil of contactor A. While the preparatory rearrangement of the system may be effected at any time prior to the withdrawal of the billet pusher to permit rod cutting, it is most conveniently done at the stage above mentioned, i. e. with the parts ready for extrusion. Just before the ram is advanced, therefore, the switch 112 is actuated and, by its momentary closing, contactor A is raised by circuit: Bus 358, wires 21, 22, contactor D (down), wires 24, 25, 26, 27, 28, bus 359. Since switch 112 immediately reopens, provision is made for holding contactor A up. This is accomplished, as shown, by circuit: Bus 358, wires 21, 22, contactor D (down) wires 24, 27, 28, bus 359. While the actuation of preparing switch 112 rearranges the circuits, it has no other immediate effect than to prepare the system for later automatic operation.

By means of the manual pilot valves the main ram is now advanced and the billet is extruded through the die bores into two rods which are fed to the coiling means and coiled as above described. When all but a short dead end of the billet is extruded the ram is stopped and withdrawn. To give the cutter access to the rods, the pusher-conduit is withdrawn. This is accomplished, as before, by closing switch 113 and opening switch 114. It may be noted that this terminates the operation of these hand switches for the cycle and leaves them in initial position for the next cycle. In the present embodiment, following the final actuation of these hand switches, the succeeding steps up to and including the discharge of the coils are automatic.

Figure 2:
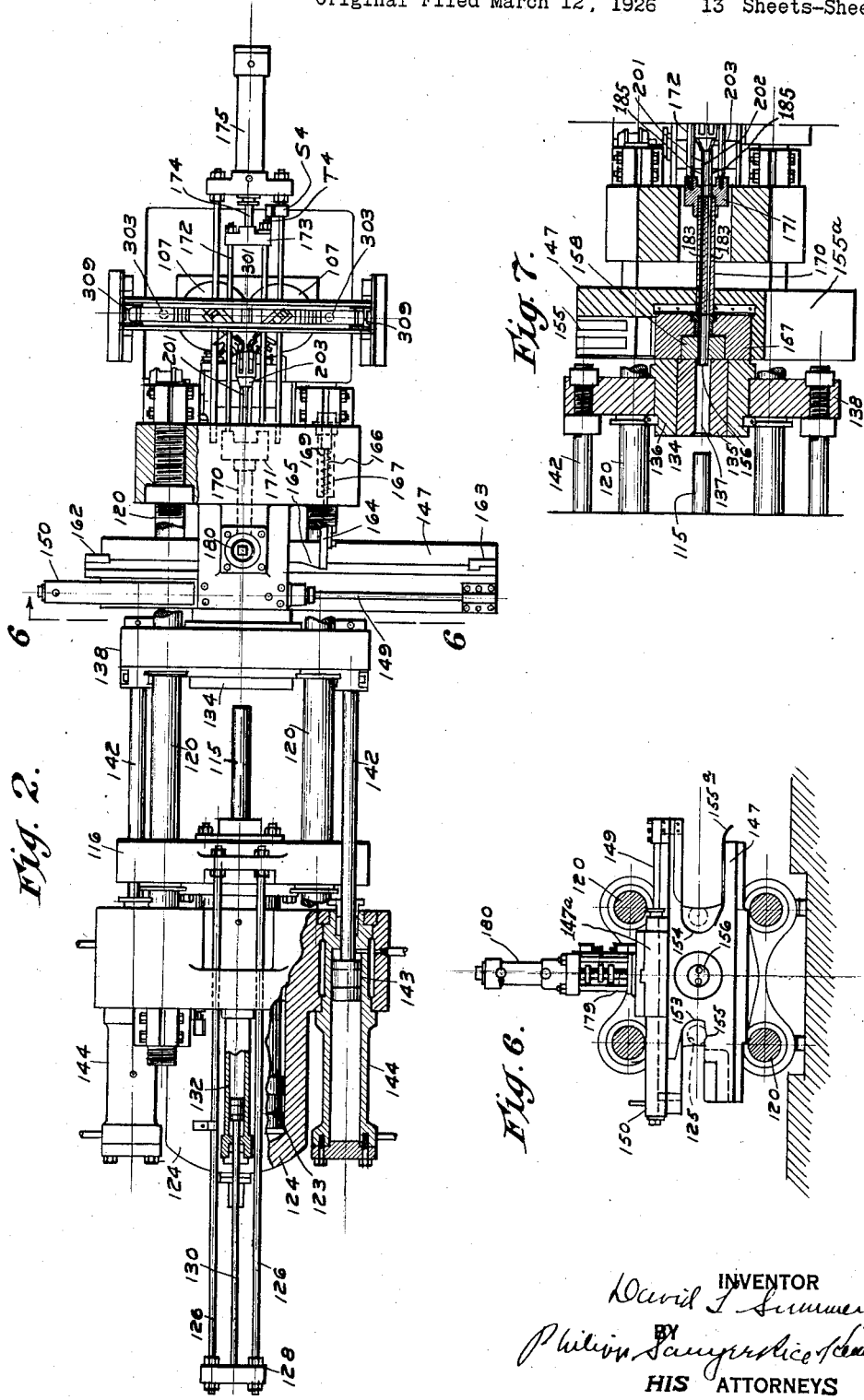
Figure 2 is a top plan view of the same with parts in horizontal section.

There is provided means for automatically causing operation of the cutter upon withdrawal of the billet pusher. This may be accomplished by causing magnetic valves V5, V6, to be reversed. As here shown as an example, located on crosshead 173 (Fig. 2) is an arm T⁴ arranged to close a normally open switch S4 when the pusher is withdrawn. This switch is of any suitable construction to be spring-held in normal position, as is the case with the other automatically operated switches later referred to. Switch S4 is in the following A. C. circuit: Bus 358, supplemental bus 351, wires 29, 30, contactor A (up), wires 31, 32, bus 359. This circuit includes the coil of contactor B which, by S4 closing, is raised. The above assume, of course, the up position of contactor A, which was raised by the preparatory closing of switch 112. Switch S4 was mechanically closed by the first withdrawal of the pusher but at that time contactor A was down. Raising contactor B reverses magnetic valves V5 and V6 to advance the cutter. V6 which was "on" was in a circuit involving down position of contactor B. This circuit being broken, V6 is "off" and the cutter exhaust valve is closed. V5 is now "on" by circuit: Bus 356, supplemental bus 350, wires 14a, 16, contactor B (up), wire 17, bus 357, and the cutter inlet valve is opened. By the resulting advance of the cutter the extruded rods are cut off at the rear of the slide and the trailing ends pass on to the coilers.

Means is provided for causing automatic operation of the coil elevator upon operation of the cutter. As above described, the elevator is capable of two types of cycles, one cooling the extruded coils and then discharging them, the other discharging the coils and then cooling the platforms. The invention in its entirety, therefore, includes alternative circuit arrangements by which either type of elevator cycle may be carried out automatically. In the present embodiment, the election of cycles is effected by a double-throw knife switch 110 and a switch 111 on panel 352. Switch 110 in up closed position connects wires 67, 68 together and connects wire 45 to a dead terminal; in down closed position it connects wires 45, 46 together and wires 67, 55a together. The effect of these different arrangements will hereafter be explained. Switch 111 either connects or disconnects wires 58, 59 with results later described.

In structures embodying the invention to the best advantage, operation of the cutter will cause the elevator to start down, e. g. by reversing magnetic valve V7 to place the auxiliary elevator pistons, normally holding the elevator up, under return pressure. In the coil-cooling cycle it will continue down but in the other cycle it will reverse and move up to discharge position without immersing the coils. While this common initial downward elevator movement may be effected in various ways, as here shown as an example, on the cutter piston rod is an arm T3 (Fig. 1) arranged to close a normally open switch S3 as the cutter reaches the end of its advance stroke. Switch S3 is in the following A. C. circuit: Bus 358, supplemental bus 351, wires 39, 40, 41, bus 359. As this circuit includes the coil of contactor D, closing of switch S3 causes contactor D to be raised. Since switch S3 opens again upon return of the cutter, to be referred to, provision is made for holding contactor D up. This is accomplished by circuit: Bus 358, wires 21, 23, contactor E (down), wires 43, 42, 41, bus 359. The lift of contactor D breaks wires 9, 8, in the circuit of solenoid V7. The latter now being de-energized, the auxiliary elevator pistons are placed under return pressure and, withdrawing, allow the elevator to descend. The main elevator pistons, it will be recalled, were initially under return pressure.

Leaving the elevator movement for the moment, means is provided for causing automatic return of the cutter upon completion of the cutting stroke, and this may conveniently be accomplished partly in common with the elevator movement just described, i. e. by the closing of switch S3 and consequent lift of contactor D. As here shown as an example, by the lift of contactor D, the circuit through wires 22, 24 is broken. As these are in the circuit holding contactor A up, the latter now drops. The up position of contactor B was, in turn, dependent on the up position of contactor A and when the latter drops the break between wires 30, 31, causes B to drop, even though switch S4 remains closed. As raising contactor B put magnetic valve V5 "on" and V6 "off" to advance the cutter, so dropping contactor B reverses these magnetic valves back to initial position and the cutter is thereby withdrawn under its constant return pressure. It is noted, moreover, that this step returns contactors A and B to initial position ready for the next cycle.

Returning now to the elevator movement, the second type of elevator cycle, i. e. discharging the coils without cooling, will first be described. For this type it is assumed that elective switch 111 is closed and elective switch 110 is in up closed position. Means is provided for causing automatic rise of the elevator without its dropping far enough to immerse the coils. This may be accomplished by reversing magnetic valve V8 upon the slight downward movement of the elevator just described. As here shown as an example, a momentary contact switch S5, operated as later described, is located to be actuated upon a slight down movement of the elevator and its actuation closes the following circuit: Bus bar 358, wire 59, elective switch 111, wires 58, 60, 61, 46, contactor D (up), wires 47, 48, bus 359. The circuit described, it will be noted from Fig. 9, includes two switches S10, S11 which are later referred to, but for the present it is assumed that these are closed. As this circuit includes the coil of contactor E, closing of the circuit by switch S5 raises the bar of this contactor. Since switch S5 is a momentary contact switch provision is made for holding contactor E up after switch S5 reopens. This is accomplished by circuit: Bus 358, wire 51, contactor F (down), wires 50, 49, 48, bus 359. Contactor E being up, a circuit is closed through the coil of magnetic valve V8, as follows: Bus 356, supplemental bus 350, wires 4, 5, 6, bus 357. This energizing of valve V8 causes variable pressure to be admitted to the main elevator cylinders and the elevator is raised thereby to discharge position. A further result of raising contactor E is a break in the circuit between wires 23, 43. These being in the circuit which held contactor D up, the latter drops, and is thus returned to initial position. By the drop of contactor D to initial position, magnetic valve V7 is reversed to initial status by its initial circuit, whereby the auxiliary pistons are advanced.

Means is provided for causing automatic operation of the discharge pushers or ejectors dependent upon the elevator reaching discharge position. As here shown as an example, a normally open switch S7 is located to be closed, as later described, when the elevator reaches discharge position. This causes contactor G to be raised by closing circuit: Bus 358, supplemental bus 351, wires 66, 62, 63, contactor F (down), wires 64, 65, bus 359. Raising of contactor G closes a circuit through the coil of magnetic valve V9, whereby variable pressure is delivered to the cylinders 314 of the discharge pushers to advance the latter and eject the extruded coils, as previously described. This circuit is: Bus 356, supplemental bus 350, wires 1, 2, contactor G (up), wire 3, bus 357.

Means is provided for automatically causing return of the discharge pushers upon completion of their stroke. As here shown as an example, associated with the respective units are normally open switches S8, S9, arranged to be closed, as later described, when the pushers complete their ejecting strokes. These switches are in series in the following circuit: Bus 358, supplemental bus 351, wires 66, 67, elective switch 110, wires 68, 54, bus 359. As this circuit includes the coil of contactor H the latter is raised by its closing. As switches S8, S9, reopen provision is made for holding contactor H up. This is accomplished by circuit: Bus 358, supplemental bus 351, wire 44, switch S12 (later referred to and assumed to be normally closed), wires 52, 53, 54, bus 359. Contactor H in lifting closes a circuit: Bus 358, supplemental bus 351, wires 66, 67, switch 110 (up), wires 68, 54, contactor H (up), wire 55, contactor G (up), wires 56, 57, bus 359. As this circuit includes the coil of contactor F, the latter is raised. This causes a break between wires 63, 64 in the circuit holding contactor G up. The latter now drops to initial position and by a break between wires 2, 3, magnetic valve V9 is reversed to initial "off" position, whereby the discharge pushers are withdrawn under return pressure.

Means is provided for automatically causing descent of the elevator following discharge of the coils and this may be accomplished partly in common with the means for causing withdrawal of the discharge pushers, i. e. the closing of switches S8, S9 and the consequent lift of contactor H. In the present type of elevator cycle the elevator is dropped clear down for cooling the platforms and the automatic control provides for putting both sets of power units under return pressure. As shown, by the lift of contactor H the circuit through magnetic valve V7 is broken by a break between wires 10, 9. Valve V7 being "off", the auxiliary elevator pistons also move down under return pressure. The main elevator pistons also move down under return pressure because by the lift of contactor F following the lift of contactor H, as above described, a break is caused between wires 50, 51 in the circuit holding up contactor E. The latter now drops to initial position and thereby causes a break between wires 6, 5, in the circuit energizing magnetic valve V8. Contactor F also drops back to initial position because of the drop of contactor G.

The descent of the elevator, in the present cycle, carries the platforms into the water tank to cool the same. Means is provided for automatically causing the elevator to return to initial position upon its reaching the end of its cooling stroke. This is accomplished by leaving the main elevator unit under return pressure and reversing magnetic valve V7 to initial "on" position, whereby the advance of the auxiliary pistons returns the elevator to initial position. As shown, this is accomplished by a normally closed switch S12 arranged to be opened, as later described, when the elevator reaches the end of its down movement. This causes a break between wires 44, 52 and so opens the circuit that was holding up contactor H which now drops to initial position. Being in initial position, circuit is made through the coil of magnetic valve V7 as in the initial circuit condition above tabled. This admits variable pressure to the auxiliary elevator cylinders and the elevator is raised to initial position and there held.

This completes the cycle as far as the extrusion of one billet is concerned and it is noted that all the power units are back in initial position and all the circuits are back in initial condition, ready for the next cycle. Before another cycle can begin the stump and sprue must be removed. This, as shown in the present embodiment, is accomplished as above described. That is, by operation of the manual pilot valves the container is caused to move back, withdrawing the stump from the die and kicking out the sprue by forcing it against the ram. The slide is then moved over to billet-receiving position and the container advanced to initial position, whereupon the parts are ready for another cycle. It will be apparent that these last manually controlled steps may be carried out during the coiling and discharge of the coils.

In the other type of elevator cycle, cooling the coils, the elevator starts down in the same way as before, namely, upon closing of switch S3 by the cutter. In this case, however, it goes to the bottom and means is provided for cutting out switch S5 which before started the elevator immediately upwardly. This is accomplished, as shown, by opening elective switch 111 in the circuit including the coil of contactor E. Consequently, when the elevator starts down, while switch S5 is mechanically actuated, it has no effect because contactor E cannot lift and so magnetic valves V7, V8, are not energized. The elevator, therefore, continues down to the bottom of its stroke, thereby immersing platforms and coils in the water bath.

Means is provided for automatically causing the elevator to be moved from cooling position to discharge position. This may be accomplished by reversing magnetic valve V8, of the main elevator pistons. Since the auxiliary piston rods are later desired in advanced position, magnetic valve V7 may be conveniently reversed at the same time. It will be recalled that in the former cycle these magnetic valves were energized to raise the elevator by the lifting of contactor E due to closing switch S5. In the present cycle this lift of contactor E was prevented by cutting out switch S5. It may conveniently be effected at a different point in the cycle by cutting in a different circuit including a switch closed when the elevator reaches the bottom. As shown, elective switch 110 is shifted to down closed position. In wire 45, formerly connected to a dead end, is a normally open switch S6 arranged to be actuated, as later described, when the elevator reaches the bottom of its stroke. This switch was, of course, closed mechanically in the former cycle but without effect because it was cut out by elective switch 110. In the present cycle switch S12 is mechanically opened but without effect because, whereas in the former cycle it resulted in a drop of contactor H, in the present cycle the latter is still down and, in fact, remains down. When switch S6 closes, it closes the following circuit: Bus 358, supplemental bus 351, wire 45, switch 110 (down), wire 46, contactor D (up), wires 47, 48, bus 359. As this circuit includes the coil of contactor E, the latter is raised. The result is as before, namely, magnetic valve V8 is energized to cause the main elevator power units to rise and by the consequent drop of contactor D magnetic valve V7 is energized, thereby causing the auxiliary elevator units to rise. The elevator is moved up, therefore, to discharge position.

Upon the elevator reaching discharge position, the discharge pushers are caused to function as before, namely, by the closing of switch S7, which raises contactor G to put magnetic valve V9 in circuit.

Means is provided for automatically causing the withdrawal of the discharge pushers and the return of the elevator to initial position after discharge of the coils. As shown, this is accomplished by the closing of switches S8, S9, as before, but by a different circuit arrangement. In the former cycle, the elevator, after discharge, was sent to the bottom, so that both main and auxiliary elevator units were placed under return pressure. In that cycle, magnetic valve V8 was de-energized by the dropping of contactor E which resulted from the drop of contactor G, which resulted, in turn, from the lift of contactor F, and the latter resulted from the lift of contactor H. Magnetic valve V7 was de-energized directly by the lift to contactor H. In the present cycle, the elevator descends only to initial position and this is effected by placing the main power units under return pressure and holding the auxiliary units advanced. Magnetic valve V8, therefore, is de-energized but not magnetic valve V7. Consequently, this circuit arrangement is such that upon closing of switches S8, S9, contactor F will be raised but not contactor H. The latter is cut out by the shifted position of elective switch 110. When switches S8 and S9 close, upon the advance stroke of the ejectors, they close the following circuit: Bus 358, supplemental bus 351, wires 66, 67, switch 110 (down), wires 55a, 55, contactor G (up), wires 56, 57, bus 359. As this circuit includes the coil of contactor F, the latter is raised. As in the former cycle, the lift of contactor F causes contactor G to drop, which causes contactor E to drop, and this, by a break between wires 6, 5, takes current off magnetic valve V8 thereby placing the main elevator units under return pressure. The elevator starts down, therefore, under return pressure but it goes down only to intermediate or initial position because the auxiliary elevator units being held up, act as stops against which the crosshead 302 strikes.

Also as in the former cycle, the dropping of contactor G, upon raising of contactor F, takes current off magnetic valve V9 whereby the ejectors withdraw under return pressure and the drop of contactor G drops contactor F.

This return of the elevator to initial position completes the automatic cycle of the second type and the return of the parts and circuits to initial condition.

There is provided interlock means for preventing operation of one mechanical element unless another mechanical element, which might interfere if improperly positioned, is properly positioned. For example, the elevator may be prevented from lifting to discharge position unless the ejectors are withdrawn. As here shown as an example, associated with the ejector units are two switches S10, S11, arranged to be held closed, as later described, when the ejectors are withdrawn. As above stated, and referring to the type of elevator cycle first described, the movement of the elevator upward to discharge position depends on the closing, by switch S5, of a circuit in which these interlock switches S10, S11 are included in series. In the above description it was merely assumed that they were closed. It will now be apparent, however, that unless both discharge pushers are withdrawn to close both of these switches S10, S11, the circuit for raising contactor E by actuation of switch S5 will not be closed. Consequently, should an ejector happen to be advanced when switch S5 is closed, the elevator is prevented from moving up to any such position that might cause interference between the parts. Similar interlocking switches may be used in circuits controlling other mechanical elements.

Examples of such interlocking switches are more fully shown in the parent application referred to.

Figure 4:
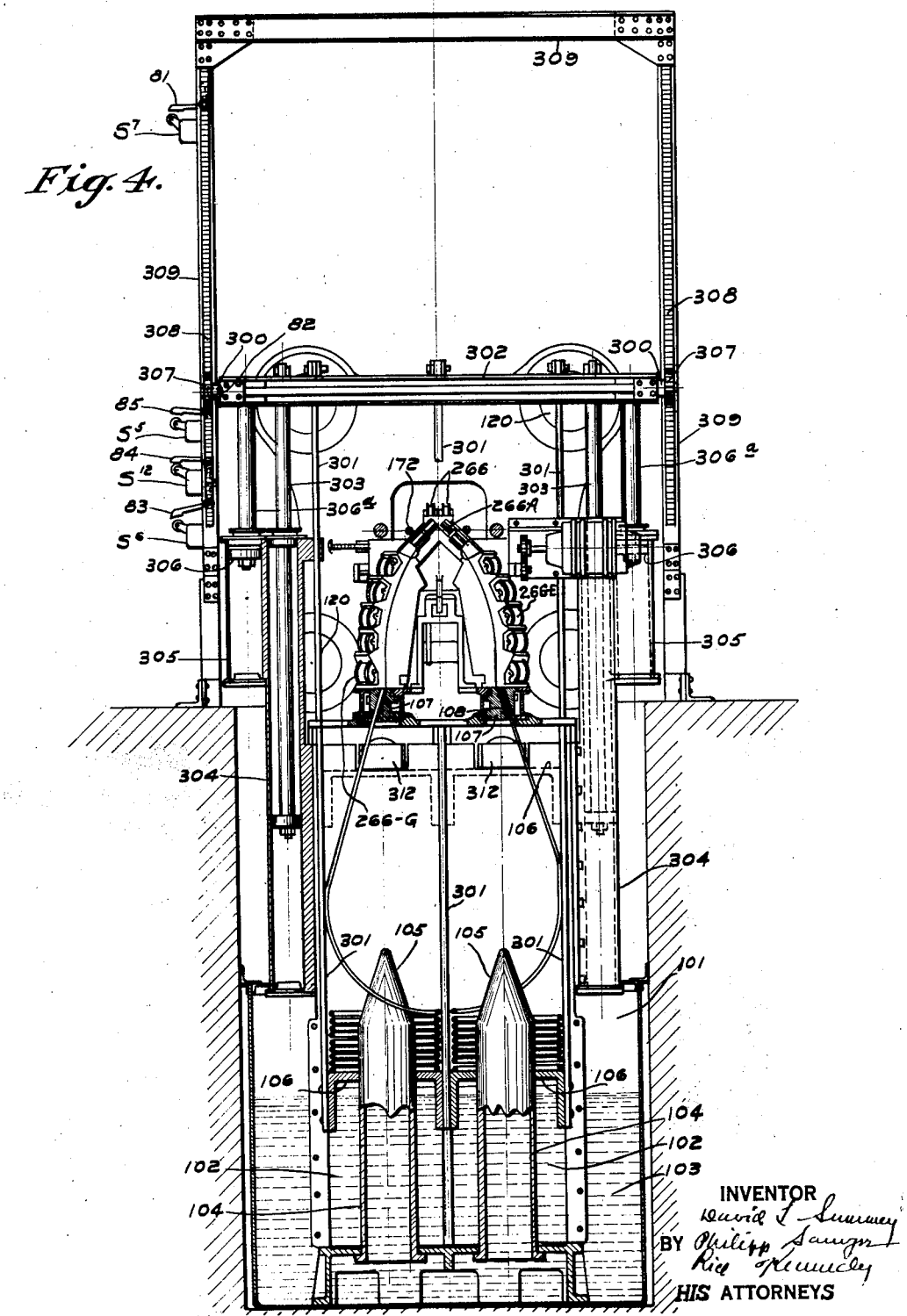
Figure 4 is an end view (enlarged) partly in vertical section, looking in the direction of the arrow of Fig. 1.

Referring to the switches operated by the elevator, as here shown as an example, switch S7 (Fig. 3) is mounted on the frame 309 near the top. It is operated by a bell crank lever 81 one end of which extends through a suitable hole in the frame 309 in the path of a roller 82 carried by elevator crosshead 302. Switches S6, S12 are also mounted on frame 309 and have similar operating levers 83, 84 arranged to be actuated by the roller when the elevator is down. Switch S5 has a similar lever 85 positioned to be actuated by the roller when the elevator starts to move below initial position (Fig. 4). Switches S8, S9, S10, S11 are operated by a suitable connection from the discharge pusher units, for example, arms moving with the pushers.

It is to be understood that the general features of the automatic cycle above described are applicable to other power units, the particular cycle and its application here shown being by way of example.

Figures 10–16 illustrate an example of a hydraulic valve unit. This unit includes a valve chest 428, having a valve chamber 427 with which communicates an inlet pipe 429 for connection with a water pressure line.

The valve chest has a second valve chamber 443 communicating with an exhaust pipe 446 for connection with the waste water line which may lead back to the suction side of the pumps. The inlet valve chamber 427 is connected with a pressure outlet pipe 445 by means of a transverse bore 440, a vertical bore 441, a second transverse bore 442, the exhaust chamber 443 and passage 444. The exhaust valve chamber is in communication with power outlet pipe 445, through passage 444. Below the inlet pipe in the inlet valve chamber is a tubular valve seat 426 on which seats an inlet valve 425. Below the exhaust outlet in the exhaust chamber is a tubular valve seat 447 on which seats an exhaust valve 448. The inlet valve is carried by a valve stem 430 which is connected by a coupling 435 with a piston rod 436, the piston 437 of which works in an air cylinder 438. The piston is operated by pressure fluid, in this case compressed air, admitted to one end or the other of the cylinder. When the piston is raised it opens inlet valve 425 and when lowered it returns the valve to its seat. The exhaust valve is carried by a valve stem 449 and is connected by a coupling, like coupling 435, with a piston rod 451. This latter is a duplicate of piston rod 436 and is actuated by a duplicating air cylinder unit. These duplicating parts are not shown in detail but the construction will be apparent from Figs. 10 and 11. In the present embodiment, the two air cylinders are formed by a common cylinder block 452 with separate bottom closures 453, 454. The valve chest 428 and the common cylinder block 452 are connected together by bolts 455, the united structure being mounted in any suitable manner.

When the exhaust valve 448 is closed and the inlet valve 425 open there is a flow of water from the main line through inlet pipe 429 to the power outlet pipe 445 and thence to the cylinder of the hydraulic power unit. When the inlet valve is closed and the exhaust valve open, the pressure water can exhaust back from the power unit through pipe 445 and out through exhaust pipe 446.

The construction just described may be considered a typical hydraulic unit, its basic features being known in the art. It corresponds to the hydraulic valve unit indicated by 323 in Fig. 8 and the other units above referred to as being like unit 323. It is noted, however, that in the case of valve units 323, 327 and 329, the air cylinders are piped to a manual control station. The present unit differs in that the air is delivered and controlled in a novel manner hereinafter described. Units 341 and 344 are different again in that their air cylinders are piped to an automatic control station, later referred to.

The front side of the cylinder block 452 has a flat face (Fig. 11). The cylinder 438 for the inlet valve has an upper passage 460 leading from the flat face of the cylinder block to the interior of the cylinder above the piston, and a similar lower passage 461 leading to a point below the piston. Bolted to the flat face of the cylinder block is a block 462 having a flat top face 463. Opening out of this flat face (Figs. 13, 14) are three vertical bores or passages 464, 465, 466, two of which communicate with the air cylinder, the third being an exhaust passage. To this end, as here shown, the block 462 has an upper transverse passage or bore 467 leading from vertical bore 464 and registering with cylinder passage 460 and a lower transverse passage 468 leading from vertical bore 465 and registering with cylinder passage 461. The block has a third transverse bore or passage 469, extending in a direction opposite to bores 467, 468, and leading from the middle vertical passage 466 to an exhaust pipe or outlet 470. In the embodiment illustrated, a valve chamber 471 is formed by the flat face 463 of the block 462 and an open sided valve housing 472 bolted to the block 462. With this construction, the three vertical passages 464, 465, 466 open directly into the valve chamber. In the top of the valve housing 472 is an inlet pipe 473 for connection with a source of pressure fluid, e. g. compressed air. Operating in the valve chamber 471 and sliding on the top face of block 462 above the three ports of the vertical passages, is a D-slide valve 474, its enclosed recess 475 being arranged to span the port of the middle passage (exhaust) and one or the other of the end ports, depending on the valve position.

Figure 13:
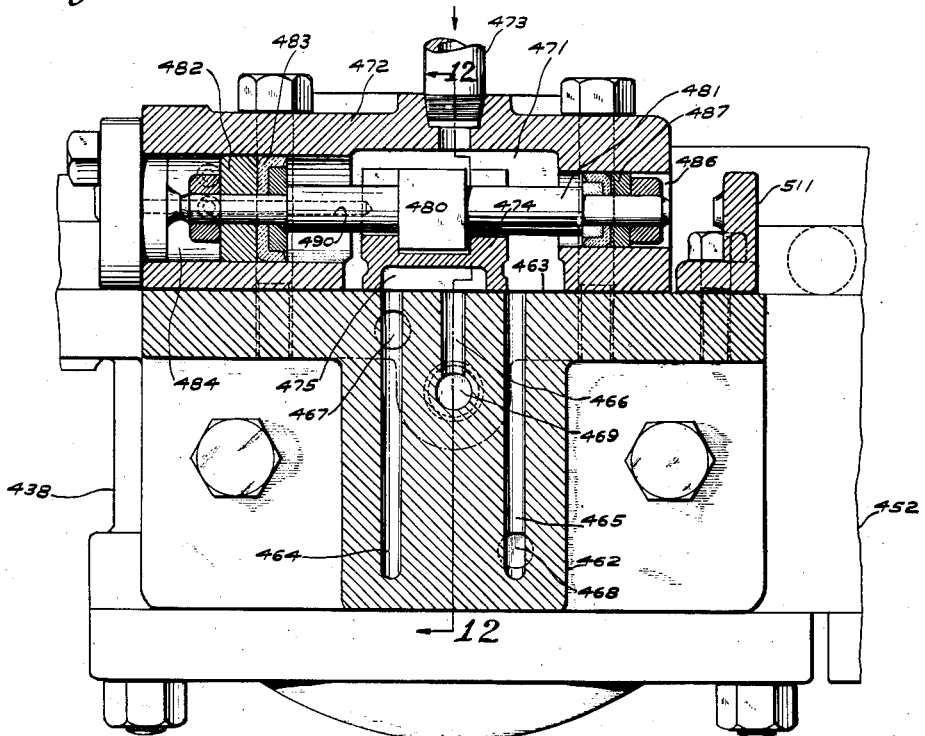
Figure 13 is a sectional view (enlarged) taken on the line 13—13 of Fig. 11.

When the D-valve is in the position of Fig. 13, end passage 465 is open to the valve chamber, thus placing the lower end of inlet valve cylinder 438 in communication with the pressure fluid. The D-valve spans the middle passage 466 and end passage 464, thus placing the upper end of cylinder 438 in communication with exhaust. The air passes from valve chamber 471 through passages 465, 468 and 461 to the cylinder and raises piston 437, thereby opening the hydraulic inlet valve 425. Meanwhile air above the piston exhausts via passages 460, 467, 464, valve recess 475, passages 466, 469 and pipe 470.

When the D-valve is moved, as later described, to the position of Fig. 14, the flow is reversed. That is, passage 464 is open to the valve chamber and the air passes via passages 467 and 460 to the upper part of cylinder piston 437, thus closing inlet valve 425. Meanwhile the air below the cylinder exhausts via passages 461, 468, 465, valve recess 475, passages 466, 469 to pipe 470.

The D-valve 474 has two forked upright abutments 478, 479 between which is freely mounted a rectangular block 480 on a piston rod 481, the rod being cradled in the forks of the abutments. This forms a simple connection by which the D-valve is moved upon movement of the piston, the block 480 moving against one abutment or the other. It also permits the D-valve to adjust itself to its seat. On one end of the piston rod 481 is a relatively large piston 482 having a packing ring 483 and sliding in a cylindrical extension 484 of the valve chamber. The end of this extension is closed by a plug cap 485. At the other end of the valve chamber is a cylindrical extension 486 substantially smaller than extension 484 and open to atmosphere. In this extension 486 slides a relatively small piston 487 also mounted on the piston rod. This latter serves as a bearing support for the piston rod and a closure for the end of the valve chamber. The opposing inner faces of both piston heads are under valve chamber pressure, but the inner area of piston 482 is larger than that of piston 487. Under normal conditions, therefore, and assuming the end of extension 484 to be open to exhaust, there is a constant effective force, measured by the air pressure on the excess of one piston area over the other, that moves the piston rod in one direction, i. e. to the left as viewed in Figs. 13, 14. When, however, air is admitted to the outlet end of extension 484, and assuming it is air under substantially the same pressure as the valve chamber air, the force of this pressure on the outer face of piston 482 plus the force of the air pressure on the inner face of piston 487 is greater than the opposing force of the pressure on the inner face of piston 482. Consequently the piston rod is moved in the opposite direction, i. e. to the right as viewed in Figs. 13, 14.

Opening out of the valve chamber 471 is a longitudinal passage 490 formed in the body of the casing 472 and communicating with a transverse bore or passage 491 which leads to the outer face of the casing. Bolted to the outer face of the casing is a valve casing 492 having a valve chamber 493 out of the lower end of which opens a transverse passage 494 registering with passage 491. Opening out of the upper end of valve chamber 493 is a second transverse passage 495 registering with a transverse passage 496 in casing 472 which leads to the outer end of extension 484 of the valve chamber 471, beyond the piston. Air from the valve chamber will, therefore, by-pass around piston 482 via passages 490, 491, 494, valve chamber 493, and passages 495, 496. The upper and lower portions of valve chamber 493 are separated by a conical valve seat 497 on which seats a conical control valve 498. When this valve is closed, the by-pass is shut off and the slide valve unit is under its normal effective pressure (Fig. 13). When, however, valve 498 is open, air by-passes from the valve chamber to the outer end of extension 484 to move the slide valve unit reversely (Fig. 13), as above described. To place extension 484 under exhaust, while valve 498 is closed, at the top of valve chamber 493 is an inverse conical valve seat 499 beyond which is a passage to atmosphere. On this valve seat seats an inverse conical valve 500. Both conical valves 498 and 500 are formed on a common valve stem 501 and are so arranged that when one valve is open the other is closed. Valve 500 is a vent valve controlling communication between the interior and exterior of valve casing 492. When valve 498 is open to by-pass actuating air, valve 500 is closed to seal the valve chamber 493. When control valve 498 is closed to shut off the by-pass, valve 500 is open, whereby air from the outer end of extension 484 exhausts via passages 496, 495 and valve chamber 493, as piston rod 481 moves under the force of normal pressure.

Figure 15:
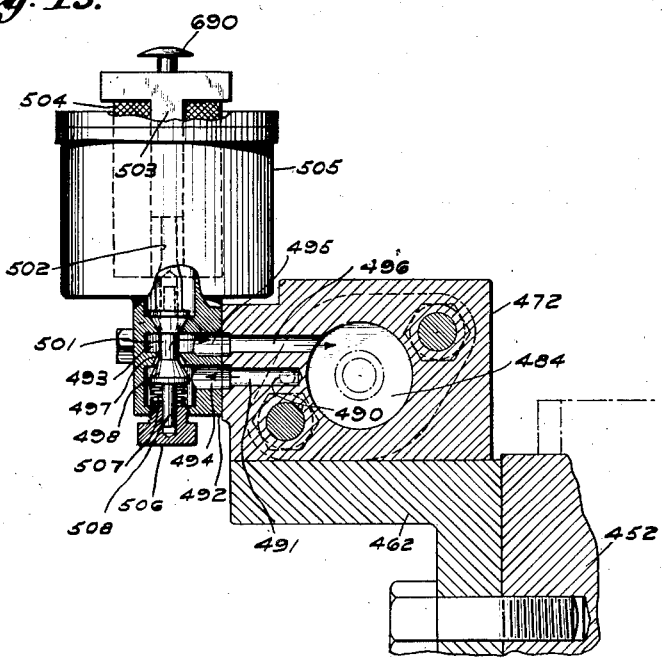
Figure 15 is a sectional view (enlarged) taken on the line 15—15 of Fig. 10.
Figure 16:
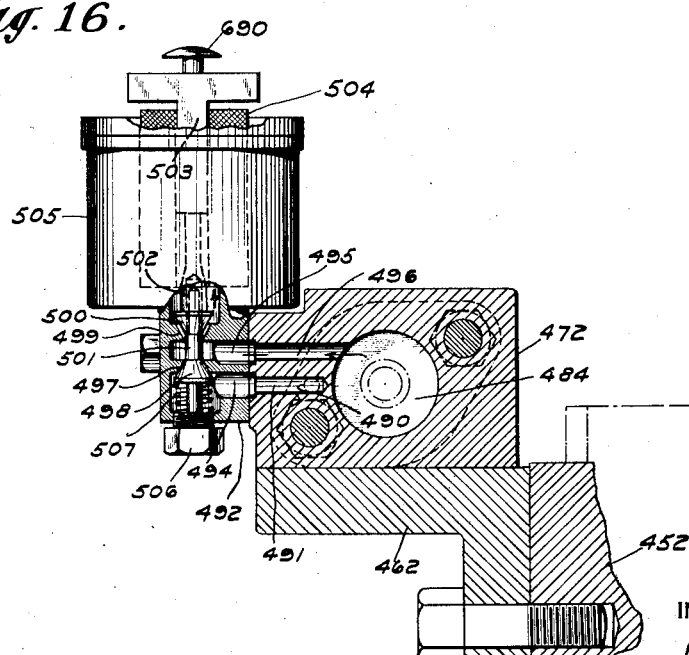
Figure 16 is a similar view showing a different position of the parts.

To operate the by-pass control valve, as here shown as an example, the upper end of the valve stem 501 is connected by a coupling 502 with the core 503 of a solenoid. This solenoid has a winding 504 and a housing 505 and is of any suitable construction. Between the bottom of valve 498 and a plug nut 506 is a return spring 507. The valve unit has a guiding tail-piece 508 sliding in nut 506. When the solenoid is energized the resulting core movement forces down the common valve stem 501 and thereby closes vent valve 500 and opens by-pass valve 498. This position is shown in Fig. 15 and corresponds to Fig. 14 in which the D-valve is moved to the right by the by-passing air. When the solenoid is de-energized, return spring 507 serves to reverse the common valve stem 501, thereby closing the by-pass valve 498 and opening vent valve 500. This position is shown in Fig. 16 and corresponds to Fig. 13 in which the D-valve is moved to the left by the normal valve chamber pressure, the fluid previously by-passed exhausting as described.

Figure 14:
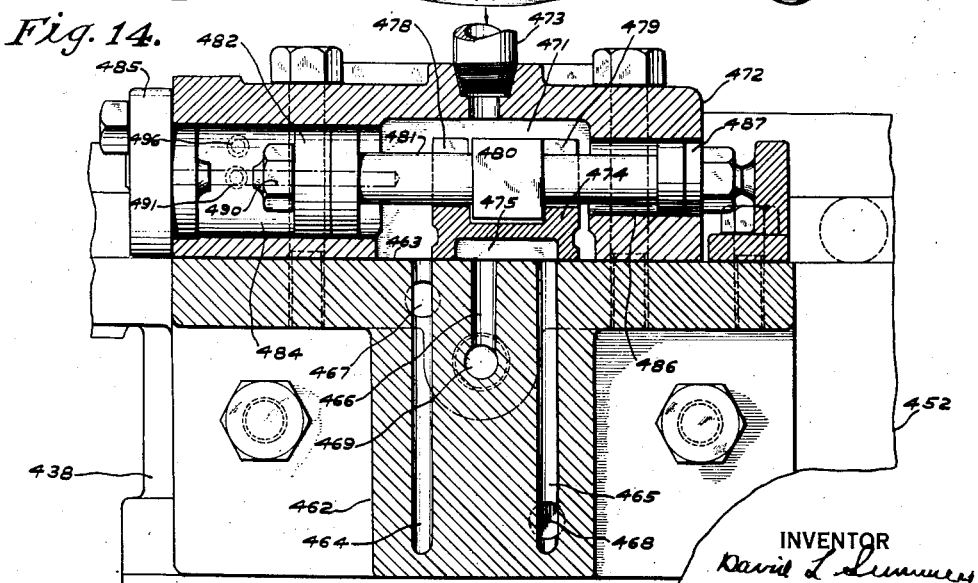
Figure 14 is a similar view showing the parts in a different position.

Piston movement to the right, as viewed in Figs. 10, 13, 14, is limited by a stop lug 511 for engagement by the end of the piston rod. At the other end the closure plug 485 serves as a stop for the other end of the piston rod to limit movement to the left. This stop construction avoids using the D-valve itself in stopping and so does not interfere with the adapting movement of the D-valve.

The construction described, including the D-valve its operating pistons, its air-actuating system and the solenoid control valve, constitute one example of an air flow selective unit that may be termed a magnetic valve.

The above described features are those associated with the inlet valve of the hydraulic unit. A like control is associated with the exhaust valve and it is unnecessary to show or describe the same in detail. Fig. 10 shows a block 462ª bolted to the common face of the cylinder casing 452 that is a reverse hand duplicate of block 462 and bears the same relation to the exhaust valve cylinder as block 462 does to the inlet valve cylinder. On the block 462ª is a valve casing 472ª that is a reverse hand duplicate of valve casing 472. It will be understood that this casing contains a D-valve, operating pistons and associated features that are reverse hand duplicates of those described, as will be apparent. That is, the two operating valve units have independently operating controls so that the inlet valve and exhaust valve may be operated independently.

In the constructions just described, the magnetic valve units are located adjacent the hydraulic units which they control. The valve chamber of the D-valve unit may be connected with the hydraulic valve unit by intervening pipes leading to a central control station. Figs. 19—20 show such an arrangement. As there illustrated as an example, carried by a framework 601 is a block 602 having a plurality of downwardly projecting bosses 603. This block is analogous to the block 462. As appears more clearly in Fig. 20, the bottom of boss 603 is tapped to receive the ends of two pipes 604, 605. Leading upwardly from the taps and opening out of the top face of block 602 are two vertical bores or passages 606, 607, which are analogous to bores 464, 465 (Fig. 13). Between the two bores is a third vertical bore 608, also opening out of top face of the block and leading to an exhaust conduit 609 which passes from end to end of the block 602. At the ends it connects with pipes 610, 611 so that exhaust may take place in both directions.

Each of the bosses 603 receives two pipes and associated with each pair of pipes is a set of three vertical bores, conduit 609 being common to the several exhaust bores.

Associated with each set of vertical bores is a D-slide valve. To this end, as here shown as an example, bolted to the top of block 602 is a common valve casing element in the form of a casting 614. Formed in this casting and extending from near one end to near the other is a recess 615 that forms, with the top face of block 602, a common valve chamber for the several units. Pressure fluid, e. g. compressed air, is admitted to the common valve chamber 615 by a pipe 616 tapped into a boss 617 and communicating with a passage 618 in the top wall of casting 614. Sliding in the valve chamber 615 over each set of vertical bores is a D-valve 620 which is like the D-valves above described. It is moved by a piston rod 621 having a piston 622 reciprocating in a cylindrical extension 623, there being one such extension formed in the casting 614 for each unit. Opposite chambers 623 are smaller cylindrical extensions 624 in which slide bearing and sealing pistons 625. The outer ends of extensions 623 are closed by caps 626. Movement of each piston is limited in one direction by cap 626, in the other by a stop 638.

To by-pass the air around the several pistons 622, as here shown as an example, the casting 614 has an upright portion 628 and on the front face of this upright, above each valve unit is a rib 629. In each rib is a vertical bore 630 leading to the outer end of chamber 623 outside the piston. Communicating with each bore 630 is a transverse bore 631 opening out of the rear face of upright 628. Below each bore 631 is a second transverse bore 632, also opening out of the face of upright 628. The several lower bores 632 communicate with a common supply conduit 633 which runs from end to end of casting 614. This conduit is connected by a slanting bore or passage 634 with the common valve chamber 615. Bolted to the rear face of upright 628 opposite each pair of transverse bores 631—632 is a by-pass control valve unit that is a duplicate of that shown in Fig. 16 and above described. Associated with each by-pass valve unit is a solenoid duplicating those described. Fig. 20 shows a by-pass valve casing 635 and solenoid housing 636, it being understood that the parts are like those shown in Fig. 16.

Each pair of pipes exemplified by pipes 604, 605 may be connected up in various ways depending on how the air is to be utilized. If the control is for the air that actuates the operating cylinders of a hydraulic valve unit, such as that of Fig. 10, two such pairs of pipes, representing two magnetic valves, lead to the hydraulic unit. One pipe of each pair leads to the top of one air cylinder, the other pipe to the bottom. In this connection it is noted that an energized solenoid may result in an open hydraulic valve and a de-energized solenoid in a closed hydraulic valve, or vice versa, depending on the air connections. Since a de-energized solenoid means a closed b-pass and that the D-valve is shifted under normal pressure, the position of Fig. 20 represents a de-energized solenoid. Consequently, if it is desired to have a de-energized solenoid represent a closed hydraulic valve, pipe 605 or its equivalent, which is open to pressure, is connected to the top of the operating cylinder for the hydraulic valve and pipe 604 or its equivalent is connected to the bottom of such operating cylinder. If, on the other hand, is is desired to have a de-energized solenoid represent an open hydraulic valve the pipe connections are reversed. A like election may be made in the case of the direct magnetic valve connection of Figs. 10-14. As there shown, Fig. 13 represents a de-energized solenoid and air is passing to the bottom of the operating cylinder for the hydraulic valve to open the latter. Fig. 14 represents an energized solenoid to close the hydraulic valve. If it is desired to have the hydraulic valve opened by an energized and closed by a de-energized solenoid, a block is substituted for block 462 having transverse bore 467 at the bottom of vertical bore 464 instead of the top and transverse bore 468 at the top of vertical bore 465 instead of the bottom, corresponding changes being made in the passages through the cylinder block.

Figure 9:
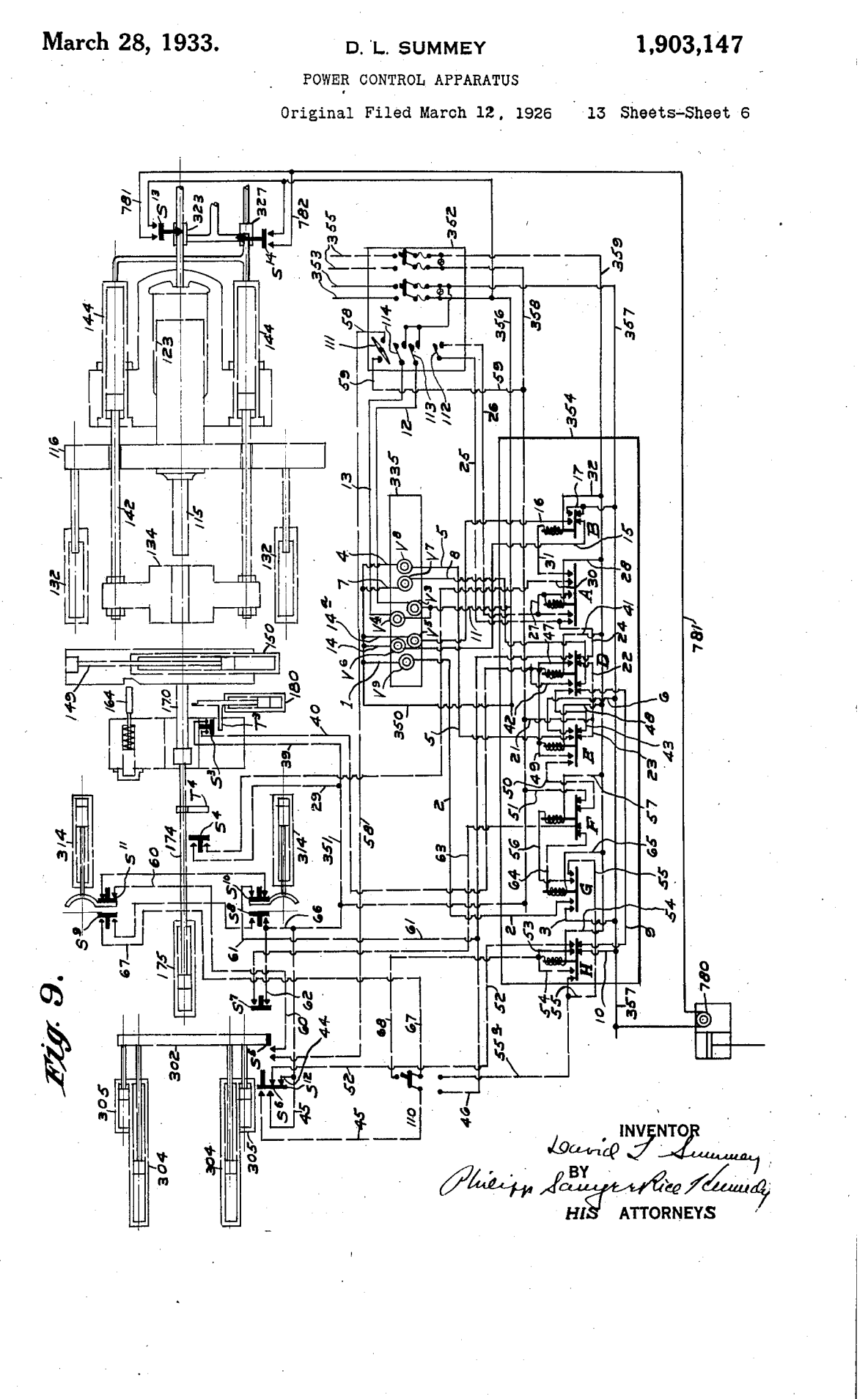

The central control station just described in connection with Figs. 19, 20, is an exemplification of the automatic control station indicated in the diagram of Figs. 8, 9 by 335. The D-slide valve 620, with its operating pistons, its solenoid, its by-pass valve and various connections and passages, is typical of the magnetic valves V3, V4, V5, V6, above referred to. The pair of pipes indicated by 345 in Fig. 8, leading from magnetic valve V5 to the inlet valve of hydraulic unit 344 corresponds to typical pipes 604, 605, and the pair of pipes 346 leading from magnetic valve V6 to the exhaust valve of the unit 344 corresponds to another pair exemplified by 604, 605. The same relation exists with respect to hydraulic unit 341 and its magnetic valves V3, V4. It will be recalled that in the description of the press and coiler it was assumed that an energized magnetic valve represented an open hydraulic valve. Consequently, that pipe of the various pairs for hydraulic units 344, 341 which corresponds to typical pipe 604 is connected with the bottom of the corresponding air cylinder of the hydraulic unit and the pipe corresponding to typical pipe 605 is connected with the top of such cylinder. Consequently, when the magnetic valve is de-energized (Fig. 20) the hydraulic valve is closed and when energized the hydraulic valve is opened.

In the case of air power units, the power cylinder is connected with the valve chamber of a magnetic valve unit which may be either a single unit or the unit of a centralized station. The air connections depend on how the power unit is operated. If its piston is moved in both directions by variable pressure, pipe 604, or its equivalent, is connected with one end of the power cylinder and pipe 605, or its equivalent, with the other end. If the air power piston is under constant return pressure, only one end of the cylinder receives variable pressure. Consequently, only one connection from the magnetic valve is necessary. That is, the D-valve simply alternately connects this one pipe with the valve chamber pressure or with exhaust. Which of the two connections typified by pipes 604, 605, is used depends upon whether the power unit is to be advanced under variable pressure upon an energized magnetic valve or upon a de-energized magnetic valve. If an energized solenoid is to represent an advanced power unit, pipe 604 or its equivalent is connected with the variable pressure end of the power cylinder and pipe 605 is plugged or removed. If, on the other hand, a de-energized solenoid is to represent an advanced solenoid, pipe 605, or its equivalent, is connected with the variable pressure end of the power cylinder and pipe 604 or its equivalent is plugged.

Figure 18 illustrates, more or less diagrammatically, the connection between an individual magnetic valve unit with an air power unit, though it is to be understood that it applies equally to the magnetic valve unit of a centralized station. As here shown the power unit comprises a cylinder 651 in which operates a piston 652 having its piston rod 653 connected with a power-receiving element represented by the rod 654. The variable pressure end of the cylinder is connected by a pipe 662 with a vertical bore 658 leading to the valve chamber of the magnetic valve unit. The other end bore 656 connects with a pipe 661 that is plugged. The rear end of cylinder 651 is under constant return pressure from a pipe 663. In the position of Fig. 18, the solenoid being de-energized, the D-valve is moved over under its normal chamber pressure to connect pipe 662 with exhaust. Consequently, piston 652 has been withdrawn under return pressure from pipe 663. When the solenoid is energized, the D-valve will be reversed, opening pipe 662 to variable pressure, and piston 652 will be advanced. In other words, an energized solenoid means an advanced power unit.

The arrangement is typical of the control of the elevator power units and coil discharge power units above described. The magnetic valve of Fig. 18, or rather its equivalent in a centralized station, is typical of magnetic valves V7, V8 and V9. Cylinder 651 is typical of main elevator cylinders 304, auxiliary elevator cylinders 305 and discharge cylinders 314. Pipe 662 is typical of pipes 340, 339 and 338, while pipe 663 is typical of the constant line for the units referred to.

If it is desired to have piston 652 of Fig. 18, or its equivalent, advanced under a de-energized solenoid, pipe 662 is plugged and pipe 661 connected with the variable pressure end of cylinder 651. If it is desired to operate piston 652 in both directions by variable pressure, return pressure pipe 663 is disconnected and pipe 661, the plug removed, is connected with the cylinder.

It is to be noted that it has been assumed that the hydraulic power units are under constant return pressure. If it is desired to operate the piston of a hydraulic power unit in both directions by variable pressure, a duplicate hydraulic valve unit is supplied for each end of the cylinder.

Referring to the electrical control, the solenoid of the magnetic valve is included in the wiring of the D. C. system and the D. C. circuit will be controlled by a relay, the solenoid coil of which is in the wiring of an A. C. system. The A. C. circuit, in turn, is controlled by make-and-break devices automatically operated by some moving part. Fig. 17 illustrates, diagrammatically, an arrangement for a typical magnetic valve unit. This unit is shown in connection with an independent magnetic valve coupled directly with a hydraulic valve unit but it will be applicable to any of the magnetic valves above referred to. The winding 670 of the typical solenoid of Fig. 17 is connected in a D. C. line 671. In this line is a relay or contactor 672 having a core 673 surrounded by a coil 674 connected in an A. C. line 675. In this A. C. line is a make-and-break device such as a normally open switch 676. When switch 676 is closed, contactor 672 lifts or closes to close the D. C. circuit, whereby the solenoid of the magnetic valve is energized. When switch 676 is open, contactor 672 drops or opens, thus breaking the D. C. circuit and de-energizing the magnetic valve.

Switch 676 may have various forms and be operated in various ways. It may, for example, be actuated by means dependent upon the movement of the power unit which it controls, as shown in Fig. 18. In the exemplification there shown, the power-receiving element 654 has two collars 641, 642 arranged to actuate a two-armed switch 643 in the A. C. line 675, this switch corresponding to switch 676. Collar 641 is located to close the switch at the end of the return stroke of the piston 652. In the position of Fig. 19 the piston has just been withdrawn under the return pressure and the switch is on the point of closing. This closing of the A. C. circuit is about to result in the closing of contactor 672 which will close the D. C. circuit and energize the solenoid of the magnetic valve. This will cause the D-valve to move to the left (Fig. 18) and admit variable pressures to pipe 662, whereby the piston is advanced. Collar 642 is located to open switch 643 at the end of the advance stroke whereby the A. C. circuit is broken, causing opening of contactor 672 and de-energizing of the solenoid of the magnetic valve. This results in a reverse movement of the D-valve and pipe 662 being again connected with exhaust, piston 652 is withdrawn under return pressure. In this construction, therefore, the power unit moves back and forth continuously and automatically. If it is desired to hold the power unit at the end of either stroke, one of the collars 641, 642 is omitted and a branch circuit is added having another switch which may be actuated, for example, by some part of another power unit. That is, Fig. 19 represents a simple construction of an automatic control, which control is developed in the circuit arrangements of Fig. 9.

For the automatic control for the independent hydraulic unit of Fig. 10, each magnetic valve has an electrical control similar to that described, as will be apparent from the above general description of the press and coiler control.

There is provided means whereby the magnetic valves may be operated, e. g. manually, independently of the electric control. As here shown as an example, the solenoid core of each magnetic valve has a button, of which button 690 of Figs. 15, 16 is typical, this button being accessible above the solenoid housing. By pressing down on button 690, either manually or mechanically, the solenoid core is depressed to open the by-pass valve just as when the solenoid is energized. Upon the release of the button the solenoid core is spring-returned to shut the by-pass valve just as when the solenoid is de-energized.

Figs. 19, 20 illustrate an example of a manual control in which the solenoid cores of the magnetic valves may be latched down, i. e. may be mechanically held in the position in which they are normally held by an energized solenoid. As there shown, the core of each solenoid has the button previously referred to. Straddling the button 690 is a bracket 691 in which is pivoted a cam 692 operated by a lever 693. By actuation of lever 693 button 690 is cammed down. The cam is so arranged that it latches the button in depressed position until reversed by reverse actuation of the lever. By this means the magnetic valve may be manually placed and mechanically held in the position corresponding to an energized solenoid.

It is sometimes desired, for various reasons, to operate a given controlled part independently of the electric control. With the construction described, a shift from automatic to manual control is accomplished with facility.

The automatic control provides for the performance in selected predetermined sequence of a plurality of successive steps or operations and it is evident that the invention is applicable to mechanism performing cycles of operation other than the production cycle hereinabove described.

What is claimed is:

1. In combination, mechanism including a plurality of cooperating devices for performing different operations in a production cycle, a fluid pressure power unit for actuating each of said devices, means including a solenoid for controlling the operation of each power unit, a circuit including the coil of said solenoid and terminals for a contactor, a solenoid-operated contactor cooperating with said terminals, a circuit including the coil of said contactor solenoid, a switch in said last-named circuit, an actuating element for said switch, and a second make-and-break device in said last-named circuit whereby the closing of such circuit by said switch depends upon the prior closing thereof by said make-and-break device.

2. In combination, two fluid pressure power units, means including a solenoid and a circuit for automatically controlling the operation of one of said fluid pressure power units, and means including an interlock switch controlling said circuit and actuated when the second power unit is in a given position, thereby preventing the operation of said first power unit unless said second power unit is in such given position.

3. In combination, mechanism including a plurality of cooperating devices for performing different operations in a production cycle, fluid pressure power units for actuating said devices, means including a solenoid for each power unit for controlling the operation of said power units, a plurality of electro-magnetic make-and-break devices for controlling said solenoids, a plurality of switches arranged to control said make-and-break devices, circuit means for locking certain of said make-and-break devices in one position regardless of their controlling switches, and means including certain of said power units for actuating said switches to control said make-and-break devices and their corresponding solenoids in predetermined order and to release said locking means in predetermined order.

4. In combination, mechanism including a plurality of cooperating devices for performing different operations in a production cycle, fluid pressure power units for actuating said devices, means including a solenoid for each power unit for controlling the operation of said power units, a plurality of electro-magnetic make-and-break devices for controlling said solenoids, a plurality of switches arranged to control said make-and-break devices, circuit means for locking certain of said make-and-break devices in one position regardless of their controlling switches, and means including certain of said power units for actuating said switches to control said make-and-break devices and their corresponding solenoids in predetermined order and to release said locking means in a different predetermined order.

5. In combination, mechanism including cooperating devices for performing different operations in a production cycle, a fluid pressure power unit for actuating one of said devices, means for controlling said unit, a second fluid pressure power unit for actuating another of said devices, means including an electrically actuated solenoid for controlling said second unit, a relay controlling the circuit for said solenoid, the circuit for said relay including a second relay and a switch automatically operated upon a predetermined movement of said first named operating unit, means for operating said second relay, and means whereby the operation of said switch is rendered ineffective as to its circuit under predetermined conditions.

6. In combination, mechanism including cooperating devices for performing different operations in a production cycle, a fluid pressure power unit for actuating one of said devices, means for controlling said unit, a second fluid pressure power unit for actuating another of said devices, means including a solenoid for controlling said second unit, a relay for controlling the circuit of said solenoid, and a manual switch and a switch automatically operated upon a predetermined movement of said first unit in the circuit of said relay for the joint control thereof.

7. In combination, mechanism including a plurality of cooperating devices for performing different operations in a production cycle, fluid pressure power units for actuating said devices, means including a solenoid for controlling operation of each unit, switches in the solenoid circuits for maintaining said solenoids in a given normal electric condition, elements actuated by said fluid pressure power units for operating said switches to control the operations of said devices through said production cycle, and safety means including inter-related switch-controlled circuits whose switches are actuated by one power unit for preventing operation of another unit unless the first unit is in a predetermined position.

8. In combination, mechanism including cooperating devices for performing in predetermined sequence different operations in a production cycle, a fluid pressure power unit for actuating each device, controlling means including a solenoid for initiating operation of each unit, a switch in the solenoid circuit for maintaining the solenoid in a given normal electric condition, elements actuated by one of said fluid pressure power units for closing said switch momentarily and then opening it, and an auxiliary circuit associated with another unit and called into action by the momentary closing of said switch, for causing said other unit to complete its operation after opening of said switch.

In testimony whereof, I have hereunto set my hand.

DAVID L. SUMMEY.

CERTIFICATE OF CORRECTION.

Patent No. 1,903,147.　　　　　　　　　　　　　　　　　　March 28, 1933.

DAVID L. SUMMEY.

It is hereby certified that error appears in the printed specification of the above numbered patent requiring correction as follows: Page 2, line 43, for "the" first occurrence read "a"; page 6, line 40, for "Elevators" read "Elevator"; and line 78, after "circuit" insert the word "broken"; page 7, line 14, beginning with "ment" strike out all to and including "contactor B" in line 20; page 9, line 24, strike out the word "also"; page 13, line 112, for "b-pass" read "by-pass"; page15, line 38, strike out the word "the", and line 45, for "pressures" read "pressure"; and that the said Letters Patent should be read with these corrections therein that the same may conform to the record of the case in the Patent Office.

Signed and sealed this 18th day of July, A. D. 1933.

M. J. Moore.

(Seal)　　　　　　　　　　　　　　　　　　　　　Acting Commissioner of Patents.